(12) United States Patent
Zhang et al.

(10) Patent No.: US 12,538,269 B2
(45) Date of Patent: Jan. 27, 2026

(54) COMMUNICATION METHOD AND APPARATUS

(71) Applicant: HUAWEI TECHNOLOGIES CO., LTD., Guangdong (CN)

(72) Inventors: Gongzheng Zhang, Hangzhou (CN); Bin Hu, Shenzhen (CN); Chen Xu, Hangzhou (CN); Rong Li, Hangzhou (CN); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 18/340,186

(22) Filed: Jun. 23, 2023

(65) Prior Publication Data

US 2023/0337194 A1 Oct. 19, 2023

Related U.S. Application Data

(63) Continuation of application No. PCT/CN2021/140327, filed on Dec. 22, 2021.

(30) Foreign Application Priority Data

Dec. 24, 2020 (CN) .......................... 202011556838.0

(51) Int. Cl.
 *H04W 72/04* (2023.01)
(52) U.S. Cl.
 CPC .................................. *H04W 72/04* (2013.01)
(58) Field of Classification Search
 None
 See application file for complete search history.

(56) References Cited

U.S. PATENT DOCUMENTS 9,553,741 B2 * 1/2017 Vaman .............. H04L 25/03019
11,984,955 B2 * 5/2024 Chen .................... H04B 7/0417
(Continued)

FOREIGN PATENT DOCUMENTS

| WO | 2021209023 A1 | 10/2021 |
| WO | 2021249515 A1 | 12/2021 |

OTHER PUBLICATIONS

Seifeddine Messaoud: "Deep Federated Q-Learning-Based Network Slicing for Industrial IoT", Oct. 26, 2020 (Oct. 26, 2020), pp. 1-27, XP093166647.

(Continued)

*Primary Examiner* — Otis L Thompson, Jr.

(57) ABSTRACT

A communication method is disclosed. The method includes: a second device receives policy related information from M first devices; the second device obtains transmission decisions of the M first devices based on the policy related information by using a second neural network; the second device updates the second neural network based on reward information, and sends, to the M first devices, information for updating a first neural network, and the third device obtains second update parameter information of the first neural network based on the first update parameter information of the first neural network of the M first devices, and sends the second update parameter information of the first neural network to the M first devices, so that the first device may update the first neural network. The second update parameter information is obtained in a training process, so that training overheads can be reduced.

20 Claims, 14 Drawing Sheets

(56) References Cited

U.S. PATENT DOCUMENTS

| | | | | |
|---|---|---|---|---|
| 2018/0240015 A1* | 8/2018 | Martin | | G06N 3/045 |
| 2018/0247549 A1* | 8/2018 | Martin | | G09B 19/00 |
| 2019/0318245 A1* | 10/2019 | Song | | G06F 9/5061 |
| 2019/0360446 A1* | 11/2019 | Chae | | G05D 1/0088 |
| 2020/0104720 A1* | 4/2020 | Bao | | G06N 3/098 |
| 2020/0125955 A1* | 4/2020 | Klinger | | G06N 3/047 |
| 2020/0177311 A1* | 6/2020 | Ho | | H03M 13/05 |
| 2020/0287639 A1* | 9/2020 | Su | | H04B 17/336 |
| 2020/0343985 A1* | 10/2020 | O'Shea | | G06N 20/00 |
| 2020/0366326 A1* | 11/2020 | Jassal | | G06N 3/08 |
| 2020/0366537 A1* | 11/2020 | Wang | | H04B 7/0626 |
| 2020/0403913 A1* | 12/2020 | Wang | | H04L 45/306 |
| 2021/0075691 A1* | 3/2021 | Zeng | | H04L 5/0048 |
| 2021/0158162 A1* | 5/2021 | Hafner | | G06N 3/006 |
| 2021/0273707 A1* | 9/2021 | Yoo | | H04L 1/0045 |
| 2021/0303967 A1* | 9/2021 | Bender | | G06N 3/08 |
| 2021/0345132 A1* | 11/2021 | Jagannath | | H04W 24/02 |
| 2022/0220828 A1* | 7/2022 | Hegde | | G06Q 50/08 |
| 2022/0343399 A1* | 10/2022 | Filipovich | | G06Q 10/00 |
| 2022/0366245 A1* | 11/2022 | Guez | | G06V 10/82 |
| 2023/0028934 A1* | 1/2023 | Shetty | | H04L 67/60 |
| 2023/0199117 A1* | 6/2023 | Koul | | H04M 3/5183 |
| | | | | 379/201.01 |
| 2023/0342177 A1* | 10/2023 | Shetty | | G06F 9/5072 |
| 2024/0005129 A1* | 1/2024 | Zhou | | G06N 3/006 |

OTHER PUBLICATIONS

Lin Zhang et al: "Deep Reinforcement Learning for Multi-Agent Power Control in Heterogeneous Networks", arxiv.org, Cornell University Library, 201 Olin Library Cornell University Ithaca, NY 14853, Aug. 9, 2020 (Aug. 9, 2020), total 31 pages,XP081735381.

Ma Yongsen YMA@CS WM Edu et al: "WiFi Sensing with Channel State Information", arxiv.org, Cornell University Library, 201 Olin Library Cornell University Ithaca, NY 14853, vol. 52, No. 3, Jun. 18, 2019 (Jun. 18, 2019), pp. 1-36, XP058450981.

Extended European Search Report issued in EP21909442.2, dated Jun. 6, 2024, 13 pages.

Chao-Kei Wen, Wan-Ting Shih, and Shi Jin, "Deep learning for massive mimo csi feedback", IEEE Wireless Communications Letters, Oct. 2018, total 4 pages.

Samuel Joseph, Rakesh Misra, and Sachin Katti, "Towards self-driving radios: Physical-layer control using deep reinforcement learning", ACM HotMobile, Feb. 2019, total 6 pages.

* cited by examiner

COMMUNICATION METHOD AND APPARATUS

CROSS REFERENCE TO RELATED APPLICATIONS

This application is a continuation of International Application No. PCT/CN2021/140327, filed on Dec. 22, 2021, which claims priority to Chinese Patent Application No. 202011556838.0, filed on Dec. 24, 2020. The disclosures of the aforementioned applications are hereby incorporated by reference in their entireties.

TECHNICAL FIELD

The present disclosure relates to the field of communication technologies, and in particular, to a communication method and an apparatus.

BACKGROUND

In a wireless communication system, a base station (BS) and user equipment (UE) may implement efficient data transmission by using channel feedback and intelligent decision-making.

Generally, in a training process of channel feedback and intelligent decision-making between one BS and one UE, the UE receives a reference signal from the BS, and the UE estimates channel information based on the reference signal, compresses the channel information by encoding a neural network, and feeds back the channel information to the BS. The BS decodes the neural network to rebuild the channel information, and the BS makes intelligent decisions based on the channel information.

However, one BS needs to serve a plurality of UEs, and one BS needs to separately perform training with the plurality of UEs. Consequently, a large number of training overheads exist in the training process.

SUMMARY

Embodiments of the present disclosure provide a communication method and an apparatus. Specifically, the communication method may also be referred to as a communication-related neural network training method. The method includes: A second device receives policy related information from M first devices; the second device obtains transmission decisions of the M first devices based on the policy related information by using a second neural network; the second device obtains reward information of the transmission decision; the second device updates the second neural network based on the reward information, and obtains information for updating a first neural network; the second device sends the information for updating the first neural network to the M first devices, where the first neural network is for obtaining the policy related information of the M first devices; a third device receives first update parameter information of the first neural network from the M first devices, and obtains second update parameter information of the first neural network based on the first update parameter information of the first neural network of the M first devices; and the third device sends the second update parameter information of the first neural network to the M first devices, so that the first device can update the first neural network based on the second update parameter information. In this case, the second update parameter information of the first neural network and the update of the second neural network are obtained in a training process between the third device or the second device and the M first devices. Compared with overheads of separately training the third device and the second device with the M first devices to obtain the second update parameter information and update the second neural network, training overheads of the first device and the second device or the third device can be reduced, because the second device or the third device does not need to be trained with the M first devices for a plurality of times, but may be trained with the M first devices once to obtain the second update parameter information and update the second neural network.

According to a first aspect, an embodiment of the present disclosure provides a communication method, including: A second device receives policy related information from M first devices, where M is an integer greater than or equal to 2; the second device obtains transmission decisions of the M first devices based on the policy related information by using a second neural network; the second device obtains reward information of the transmission decision; the second device updates the second neural network based on the reward information, and obtains information for updating a first neural network; the second device sends the information for updating the first neural network to the M first devices, where the first neural network is for obtaining the policy related information of the M first devices; a third device receives first update parameter information of the first neural network from the M first devices, and obtains second update parameter information of the first neural network based on the first update parameter information of the first neural network of the M first devices, where the third device and the second device are a same device or different devices; and the third device sends the second update parameter information of the first neural network to the M first devices, where the second update parameter information of the first neural network is related to M pieces of first update parameter information of the first neural network sent by the M first devices. In this case, the second update parameter information of the first neural network and the update of the second neural network are obtained in a training process between the third device or the second device and the M first devices. Compared with overheads of separately training the third device and the second device with the M first devices to obtain the second update parameter information and update the second neural network, training overheads of the first device and the second device or the third device can be reduced, because the second device or the third device does not need to be trained with the M first devices for a plurality of times, but may be trained with the M first devices once to obtain the first update parameter information and update the second neural network.

In a possible implementation, the policy related information is related to a decision type of the second device, and types of transmission parameters that are for transmission between the second device and each of M first devices and that are included in different decision types are different.

In a possible implementation, the decision type includes modulation and coding scheme (MCS) selection or multiple-input multiple-output (MIMO) mode selection.

In a possible implementation, the obtaining second update parameter information of the first neural network based on the first update parameter information of the first neural network of the M first devices includes: the second update parameter information of the first neural network is a function of the first update parameter information of the first neural network of the M first devices.

In a possible implementation, the information for updating the first neural network includes a hidden layer error corresponding to the policy related information of the first device, the first update parameter information of the first neural network includes first gradient information of the first neural network, and the second update parameter information of the first neural network includes target gradient information.

That the second device sends the information for updating the first neural network to the M first devices, where the first neural network is for obtaining the policy related information of the M first devices includes: The second device obtains a hidden layer error of the second neural network based on the reward information, where the hidden layer error is an error that is of a first layer parameter of the second neural network and that is obtained based on the second neural network and the reward information; and the second device sends the M first devices hidden layer errors corresponding to policy related information of the M first devices.

That a third device receives first update parameter information of the first neural network from the M first devices, and obtains second update parameter information of the first neural network based on the first update parameter information of the first neural network of the M first devices includes: The third device receives the first gradient information of the first neural network of the M first devices from the M first devices; and the third device obtains the target gradient information based on the first gradient information of the first neural network of the M first devices.

That the third device sends the second update parameter information of the first neural network to the M first devices, where the second update parameter information of the first neural network is related to M pieces of first update parameter information of the first neural network sent by the M first devices includes: the third device sends the target gradient information to the M first devices, where the target gradient information is used by any one of the first devices to update the first neural network.

In a possible implementation, that the third device obtains the target gradient information based on the first gradient information of the first neural network of the M first devices includes: The third device obtains the target gradient information based on a function of the first gradient information of the first neural network of the M first devices.

In a possible implementation, that the third device obtains the target gradient information based on the first gradient information of the first neural network of the M first devices includes: The third device performs weighted averaging calculation on the first gradient information of the first neural network of the M first devices, to obtain the target gradient information.

In a possible implementation, the information for updating the first neural network includes the reward information corresponding to the first device, the first update parameter information of the first neural network includes a parameter of an updated first neural network, and the second update parameter information of the first neural network includes a target parameter of the first neural network.

That the second device sends the information for updating the first neural network to the M first devices, where the first neural network is for obtaining the policy related information of the M first devices includes: The second device sends the M first devices reward information corresponding to the M first devices, where the reward information is used by any of the first devices to update a first neural network of the first device.

That a third device receives first update parameter information of the first neural network from the M first devices, and obtains second update parameter information of the first neural network based on the first update parameter information of the first neural network of the M first devices includes: The third device receives M parameters of the updated first neural network from the M first devices; and the third device obtains a target parameter of the first neural network based on the M parameters of the updated first neural network.

That the third device sends the second update parameter information of the first neural network to the M first devices, where the second update parameter information of the first neural network is related to M pieces of first update parameter information of the first neural network sent by the M first devices includes: The third device sends the target parameter of the first neural network to the M first devices, where the target parameter of the first neural network is used by any one of the first devices to update the first neural network.

In a possible implementation, that the third device obtains a target parameter of the first neural network based on the M parameters of the updated first neural network includes: The third device obtains the target parameter of the first neural network based on a function of the M parameters of the updated first neural network.

In a possible implementation, that the third device obtains a target parameter of the first neural network based on the M parameters of the updated first neural network includes: The third device performs weighted averaging calculation on the M parameters of the updated first neural network, to obtain the target parameter of the first neural network; or the third device determines a parameter with a largest reward in the M parameters of the updated first neural network, to obtain the target parameter of the first neural network.

In a possible implementation, the M first devices belong to a same group, and the group is determined based on one or more of a decision type, a device level, a decoding capability, or a geographical position of a device.

In a possible implementation, the method further includes: The third device stores the updated first neural network; the third device receives a request from a fourth device; and the second device sends parameter information of the updated first neural network to the fourth device according to the request.

In a possible implementation, the method further includes: The third device sends parameter information of the updated first neural network to a fourth device.

In a possible implementation, the method further includes: The third device receives a request from a fourth device; and the third device sends a first dataset to the fourth device according to the request, where the first dataset is obtained by the third device based on the second update parameter information of the first neural network, the first dataset includes a set of a plurality of inputs and outputs of the first neural network, the output is the policy related information, and the first dataset is used by the fourth device to train a neural network.

In a possible implementation, the method further includes: The second device sends a reference signal for channel state estimation to the M first devices, where the reference signal for channel state estimation is related to the policy related information.

In a possible implementation, that the second device obtains reward information of the transmission decision includes: The second device transmits data with the M first devices based on the transmission decision; the second device receives feedback information, where the feedback information is feedback information of the M first devices for the data transmitted by the M first devices; and the second device obtains the reward information based on the feedback information.

In a possible implementation, the policy related information includes channel negotiation information (CNI).

According to a second aspect, an embodiment of the present disclosure provides a communication method, including: A first device obtains policy related information based on a first neural network; the first device sends the policy related information to a second device, where the policy related information is for inputting a second neural network of the second device; the first device receives information for updating the first neural network from the second device, where the information for updating the first neural network is related to the second neural network and the policy related information; the first device updates the first neural network based on the information for updating the first neural network, and sends first update parameter information of the first neural network to a third device, where the third device and the second device are a same device or different devices; the first device receives second update parameter information of the first neural network from the third device, where the second update parameter information of the first neural network is related to the first update parameter information of the first neural network sent by the first device and first update parameter information of at least one first neural network of another first device than the first device; and the first device updates the first neural network based on the second update parameter information of the first neural network.

In a possible implementation, the policy related information is related to a decision type of the second device, and types of transmission parameters that are for transmission between the second device and each of M first devices and that are included in different decision types are different.

In a possible implementation, the decision type includes modulation and coding scheme (MCS) selection or multiple-input multiple-output (MIMO) mode selection.

In a possible implementation, that the second update parameter information of the first neural network is related to the first update parameter information of the first neural network sent by the first device and first update parameter information of at least one first neural network of another first device than the first device includes: the second update parameter information of the first neural network is a function of the first update parameter information of the first neural network sent by the first device and the first update parameter information of the at least one first neural network of the another first device than the first device.

In a possible implementation, the information for updating the first neural network includes a hidden layer error corresponding to the policy related information sent by the first device, the first update parameter information of the first neural network includes first gradient information of the first neural network, and the second update parameter information of the first neural network includes target gradient information.

That the first device receives information for updating the first neural network from the second device, where the information for updating the first neural network is related to the second neural network and the policy related information includes: The first device receives, from the second device, the hidden layer error corresponding to the policy related information sent by the first device, where the hidden layer error is an error of a first layer parameter of the second neural network that is obtained based on the second neural network and reward information, and the reward information is related to the second neural network of the second device and the policy related information sent by the first device.

That the first device updates the first neural network based on the information for updating the first neural network, and sends first update parameter information of the first neural network to a third device includes: The first device calculates the first gradient information of the first neural network based on the hidden layer error; and the first device sends the first gradient information to the third device.

That the first device receives second update parameter information of the first neural network from the third device, where the second update parameter information of the first neural network is related to the first update parameter information of the first neural network sent by the first device and first update parameter information of at least one first neural network of another first device than the first device includes: The first device receives target gradient information from the third device, where the target gradient information is related to the first gradient information of the first neural network sent by the first device and first gradient information of at least one first neural network of another first device than the first device.

In a possible implementation, that the target gradient information is related to the first gradient information of the first neural network sent by the first device and first gradient information of at least one first neural network of another first device than the first device includes: The target gradient information is a function of the first gradient information of the first neural network sent by the first device and the first gradient information of the at least one first neural network of the another first device than the first device.

In a possible implementation, the target gradient information is a weighted average of the first gradient information of the first neural network sent by the first device and the first gradient information of the at least one first neural network of the another first device than the first device.

In a possible implementation, the information for updating the first neural network includes the reward information corresponding to the first device, the first update parameter information of the first neural network includes a parameter of an updated first neural network, and the second update parameter information of the first neural network includes a target parameter of the first neural network.

That the first device receives information for updating the first neural network from the second device, where the information for updating the first neural network is related to the second neural network and the policy related information includes: The first device receives the reward information corresponding to the first device from the second device, where the reward information is related to the second neural network of the second device and the policy related information sent by the first device.

That the first device updates the first neural network based on the information for updating the first neural network, and sends first update parameter information of the first neural network to a third device includes: The first device updates the first neural network based on the reward information, to obtain a parameter of an updated first neural network; and the first device sends the parameter of the updated first neural network to the third device.

That the first device receives second update parameter information of the first neural network from the third device, where the second update parameter information of the first neural network is related to the first update parameter information of the first neural network sent by the first device and first update parameter information of at least one first neural network of another first device than the first device includes: The first device receives the target parameter of the first neural network from the third device, where the target parameter of the first neural network is related to the parameter of the update first neural network sent by the first device and a parameter of at least one updated first neural network of another first device than the first device.

In a possible implementation, that the target parameter of the first neural network is related to the parameter of the update first neural network sent by the first device and a parameter of at least one updated first neural network of another first device than the first device includes: The target parameter of the first neural network is a function of the parameter of the update first neural network sent by the first device and a parameter of at least one updated first neural network of another first device than the first device.

In a possible implementation, the target parameter of the first neural network is a weighted average function or a function of selecting a largest reward of the parameter of the update first neural network sent by the first device and a parameter of at least one updated first neural network of another first device than the first device.

In a possible implementation, that a first device obtains policy related information based on a first neural network includes: The first device receives a reference signal for channel state estimation from the second device, where the reference signal for channel state estimation is related to the policy related information; the first device obtains a channel state based on the reference signal for channel state estimation; and the first device inputs the channel state into the first neural network to obtain the policy related information.

In a possible implementation, before that the first device receives second update parameter information of the first neural network from the third device, the method further includes: The first device receives data from the second device; and the first device sends feedback information of the data to the second device, where the feedback information is used by the second device to calculate the reward information.

In a possible implementation, the method further includes: The first device receives a request from a fourth device; and the first device sends parameter information of the updated first neural network to the fourth device according to the request.

In a possible implementation, the method further includes: The first device receives a request from a fourth device; and the first device sends a second dataset to the fourth device according to the request, where the second dataset is obtained by the first device based on the updated first neural network, the second dataset includes a set of a plurality of inputs and outputs of the first neural network, the input is the channel state, the output is the policy related information, and the second dataset is used by the fourth device to train a neural network.

According to a third aspect, an embodiment of the present disclosure provides a communication apparatus. The apparatus provided in the present disclosure has a function of implementing behavior of the first device, the second device, or the third device in the foregoing methods or aspects, and includes a corresponding component (means) configured to perform the steps or functions described in the foregoing methods or aspects. The steps or functions may be implemented by software, hardware, or a combination of hardware and software.

In an example embodiment, the apparatus includes one or more processors. Further, the apparatus may include a communication unit. The one or more processors are configured to support the apparatus in performing a corresponding function of the second device in the foregoing methods, for example, obtaining the reward information of the transmission decision. The communication unit is configured to support the apparatus in communicating with another device, to implement a receiving function and/or a sending function, for example, sending the information for updating the first neural network to the M first devices.

Optionally, the apparatus may further include one or more memories. The memory is configured to be coupled to the processor, and the memory stores program instructions and/or data necessary for a base station. The one or more memories may be integrated with the processor, or may be disposed independent of the processor. This is not limited in the present disclosure.

The apparatus may be a base station, a gNB or a TRP, a DU or a CU, or the like. The communication unit may be a transceiver or a transceiver circuit. Optionally, the transceiver may alternatively be an input/output circuit or an interface.

The apparatus may alternatively be a chip. The communication unit may be an input/output circuit or an interface of the chip.

In another example embodiment, the apparatus includes a transceiver, a processor, and a memory. The processor is configured to control the transceiver or to receive and send a signal, and the memory is configured to store a computer program. The processor is configured to run the computer program in the memory, to enable the apparatus to perform the method completed by the second device in the first aspect.

In an example embodiment, the apparatus includes one or more processors. Further, the apparatus may include a communication unit. The one or more processors are configured to support the apparatus in performing a corresponding function of the first device in the foregoing methods, for example, obtaining the policy related information based on the first neural network. The communication unit is configured to support the apparatus in communicating with another device, to implement a receiving function and/or a sending function, for example, sending the policy related information to the second device.

Optionally, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in the present disclosure.

The apparatus may be an intelligent terminal, a wearable device, or the like. The communication unit may be a transceiver or a transceiver circuit. Optionally, the transceiver may alternatively be an input/output circuit or an interface.

The apparatus may alternatively be a chip. The communication unit may be an input/output circuit or an interface of the chip.

In another example embodiment, the apparatus includes a transceiver, a processor, and a memory. The processor is configured to control the transceiver or to receive and send a signal, and the memory is configured to store a computer program. The processor is configured to run the computer program in the memory, to enable the apparatus to perform the method completed by the first device in the second aspect.

According to a fourth aspect, an embodiment of the present disclosure provides a communication system. The system includes the second device.

Optionally, the communication system further includes the first device.

According to a fifth aspect, an embodiment of the present disclosure provides a readable storage medium or a program product, configured to store a program. The program includes instructions configured to perform the method in the first aspect or the second aspect.

According to a sixth aspect, an embodiment of the present disclosure provides a readable storage medium or a program product, configured to store a program. When the program is run on a computer, the computer is enabled to perform the method in the first aspect or the second aspect.

It should be understood that technical solutions of the second aspect to the sixth aspect of the present disclosure correspond to technical solutions of the first aspect of the present disclosure. Beneficial effects achieved by the aspects and corresponding feasible implementations are similar, and details are not described again.

DESCRIPTION OF EMBODIMENTS

In addition, to clearly describe the technical solutions in embodiments of the present disclosure, words such as "first" and "second" are used in embodiments of the present disclosure to distinguish between same items or similar items that have basically the same functions or purposes. For example, a first chip and a second chip are merely used to distinguish between different chips, and a sequence of the first chip and the second chip is not limited. A person skilled in the art may understand that the terms such as "first" and "second" do not limit a quantity or an execution sequence, and that the terms such as "first" and "second" do not indicate a definite difference.

It should be noted that, in embodiments of the present disclosure, the word such as "example" or "for example" is used to represent giving an example, an illustration, or a description. Any embodiment or design scheme described as an "example" or "for example" in the present disclosure should not be explained as being more preferred or having more advantages than other embodiments or design schemes. Exactly, use of the words such as "example" or "for example" is intended to present a related concept in a specific manner.

In embodiments of the present disclosure, "at least one" means one or more, and "a plurality of" means two or more. "And/or" describes an association relationship between associated objects, and indicates that three relationships may exist. For example, A and/or B may indicate one of the following three cases: A exists alone, both A and B exist, and B exists alone, where A and B may be singular or plural. The character "/" usually indicates an "or" relationship between the associated objects. "At least one item (piece) of the following" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Feedback control is one of core technologies for implementing efficient transmission in wireless communication systems represented by cellular networks. Feedback information in feedback control is mainly designed for control mechanisms. For example, the feedback information may include: channel quality indicator (CQI) for modulation and coding scheme (MCS) selection, full channel information for multiple-input multiple-output (MIMO) transmission, precoding matrix indicator (PMI), rank indication (RI), or the like.

Figure 1:
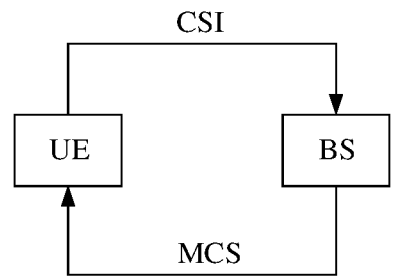
FIG. 1 is a schematic diagram of cellular network feedback control according to an embodiment of the present disclosure.

For example, FIG. 1 is a schematic diagram of cellular network feedback control according to an embodiment of the present disclosure. As shown in FIG. 1, user equipment (UE) estimates channel state information (CSI) of a downlink channel based on a reference signal delivered by a base station (BS), and feeds back the CSI to the BS. The BS selects a modulation and coding scheme (MCS) based on the CSI. The CSI may be understood as feedback information.

As complexity of a wireless communication system increases, feedback overheads at a UE end rapidly increase. For example, for a frequency division duplex (FDD) massive multiple-input multiple-output (Massive MIMO) system, as a quantity of antennas increases, overheads of channel state information fed back by a UE end to a BS increase.

In a possible case, a machine learning technology may be used in the control mechanism to improve an intelligence level of control. For example, the machine learning technology may include supervised learning, reinforcement learning, or the like.

Supervised learning means learning a mapping relationship between an input (data) and an output (a label) from a given training set (including a plurality of pairs of inputs (data) and outputs (labels)). The mapping relationship may be a pattern or a function from the input (data) to the output (label). In addition, the mapping relationship may be further applied to data outside the training set, so that an expected output can be obtained by using a new input.

Figure 2:
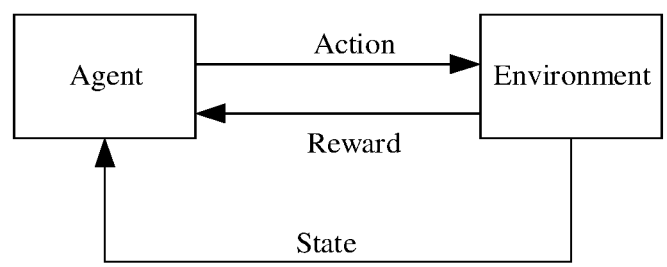
FIG. 2 is a schematic diagram of reinforcement learning according to an embodiment of the present disclosure.

Reinforcement learning is a manner in which an agent interacts with an environment for learning. For example, FIG. 2 is a schematic diagram of reinforcement learning according to an embodiment of the present disclosure. As shown in FIG. 2, the agent performs an action on the environment based on a state fed back by the environment at a current moment, to obtain a reward and a state at a next moment. A purpose of reinforcement learning is to enable the agent to accumulate most rewards within a period of time.

Reinforcement learning is different from supervised learning. Reinforcement learning is mainly reflected in a training set that does not need to be labeled. Reinforcement learning usually uses reinforcement signals (usually scalar signals) provided by the environment to evaluate whether a generated action is good or bad. The reinforcement learning system is not told how to generate a correct action. Because an external environment provides little information, the agent needs to learn from its own experience. In this way of consistent learning, the agent obtains knowledge in an action-evaluation environment and improves an action plan to adapt to the environment.

Multi-agent reinforcement learning means that a plurality of agents interacts with the environment and perform actions at the same time, and is usually used in a scenario in which a task is completed through cooperation. For example, the scenario may be joint scheduling of a plurality of base stations, joint platooning of a plurality of vehicles in self-driving, multi-user joint transmission in device-to-device (D2D), future inter-machine communication, or the like. The plurality of agents may learn independently or may perform joint learning and act independently. The agents perform information exchange through communication to implement collaboration between multi-agents and better complete the task.

Figure 3:
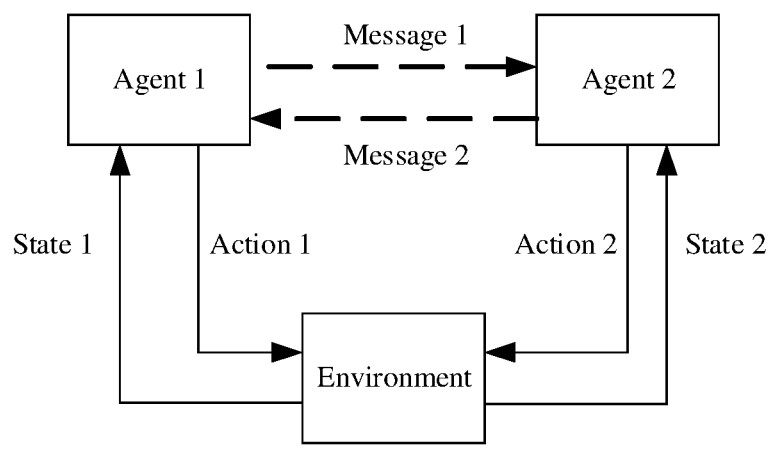
FIG. 3 is a schematic diagram of multi-agent reinforcement learning according to an embodiment of the present disclosure.

For example, FIG. 3 is a schematic diagram of multi-agent reinforcement learning according to an embodiment of the present disclosure. As shown in FIG. 3, an agent 1 obtains a message 1 based on a state 1 fed back by an environment, sends the message 1 to an agent 2, and performs an action 1 on the environment. Similarly, the agent 2 obtains a message 2 based on a state 2 fed back by the environment, sends the message 2 to the agent 1, and performs an action 2 on the environment. In this way, in a process of communication between the agent 1 and the agent 2, the communication process may be adaptively adjusted based on the messages received by the agents, so that communication and collaboration capabilities of the agent 1 and the agent 2 in the same environment are improved.

Reinforcement learning algorithms, including deep reinforcement learning (DRL), are used during reinforcement learning. Deep reinforcement learning combines reinforcement learning with deep learning and uses a neural network (NN) to model a policy/value function to adapt to larger input and output dimensions. For example, the reinforcement learning algorithm may include a Q-learning algorithm, a policy gradient algorithm, an actor-critic algorithm, and the like.

The neural network is a machine learning technology that simulates a neural network of a human brain to implement artificial intelligence. The neural network includes an input layer, a hidden layer, and an output layer, and each layer includes a plurality of neurons.

In a possible manner, each connection line of neurons corresponds to one weight, a value corresponding to the weight is referred to as a weight, and the weight may be updated through neural network training. Updating the neural network refers to updating a weight on a connection line of neurons. When a structure of the neural network (for example, how the neurons are connected and/or a weight of each connection line) is known, all information (for example, an output value of each neuron or a gradient corresponding to the neuron) of the neural network may be known.

Figure 4:
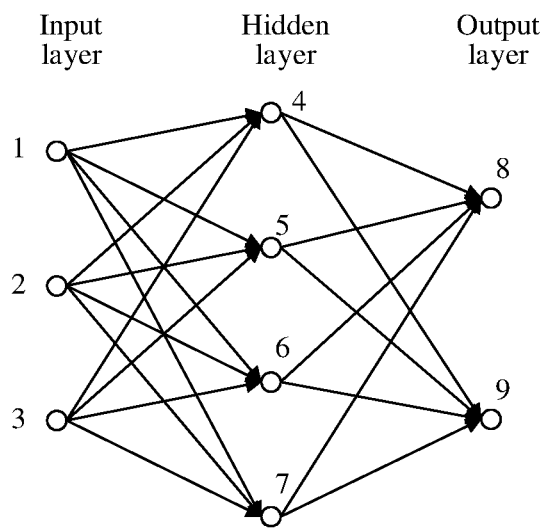
FIG. 4 is a schematic diagram of a structure of a three-layer neural network according to an embodiment of the present disclosure.

For example, FIG. 4 is a schematic diagram of a structure of a three-layer neural network according to an embodiment of the present disclosure. As shown in FIG. 4, the three-layer neural network includes an input layer, a hidden layer, and an output layer. The input layer includes a neuron 1, a neuron 2, and a neuron 3, the hidden layer includes a neuron 4, a neuron 5, a neuron 6, and a neuron 7, the output layer includes a neuron 8 and a neuron 9, and there is a connection line between a neuron at each layer and a neuron at an upper layer.

Figure 5:
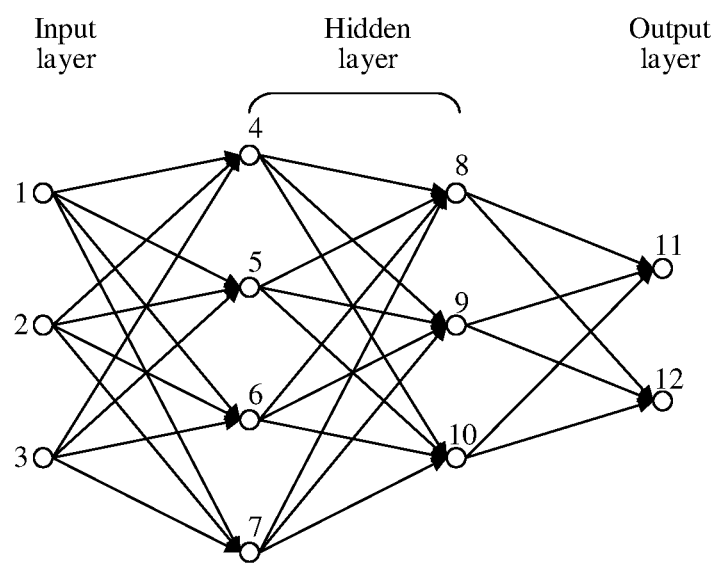
FIG. 5 is a schematic diagram of a structure of a feedforward neural network according to an embodiment of the present disclosure.

For example, FIG. 5 is a schematic diagram of a structure of a feedforward neural network according to an embodiment of the present disclosure. As shown in FIG. 5, the feedforward neural network includes an input layer, two hidden layers, and an output layer. The input layer includes a neuron 1, a neuron 2, and a neuron 3, the hidden layers include a neuron 4, a neuron 5, a neuron 6, a neuron 7, a neuron 8, a neuron 9, and a neuron 10, and the output layer includes a neuron 11 and a neuron 12.

It can be learned from FIG. 4 and FIG. 5 that each neuron may have a plurality of input connection lines, the plurality of input connection lines indicates that there are a plurality of input values, and each connection line corresponds to one weight. In this way, each neuron may calculate an output value of the neuron based on the plurality of input values.

Figure 6:
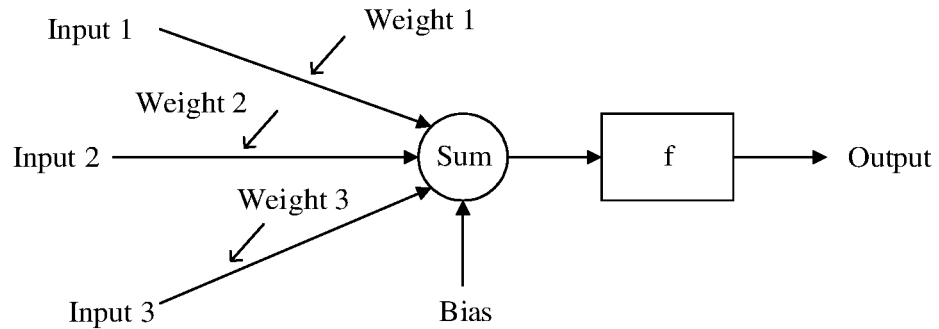
FIG. 6 is a schematic diagram of neuron calculation according to an embodiment of the present disclosure.

For example, FIG. 6 is a schematic diagram of a neuron calculation according to an embodiment of the present disclosure. A function implemented by a neuron is as follows: An input value is multiplied by a weight and then a bias is added, the bias is also updated through neural network training, where the weight and the bias are collectively referred to as a weight subsequently, to obtain a linear result, and the linear result converted by using an activation function (or referred to as a nonlinear excitation function) to obtain a corresponding output. As shown in FIG. 6, the neuron includes three input connection lines, and each input connection line has an input and a weight. Therefore, an output of the neuron may be represented as: output=f(input 1*weight 1+input 2*weight 2+input 3*weight 3+bias).

In a possible manner, f(·) represents the activation function (or referred to as the non-linear excitation function), and a result of the input values and the weights (for example, input 1*weight 1+input 2*weight 2+input 3*weight 3+bias) may be referred to as the linear result. The activation function may be used to convert the linear result, so that the neural network no longer uses a complex linear combination to approach a smooth curve to divide a plane, but may directly learn a smooth curve to divide a plane.

The activation function includes a softmax function, a sigmoid function, a ReLU function, a tanh function, or the like. If x represents a linear result, the softmax function meets:

$$\text{softmax}\left(f_i(x) = \frac{e^x i}{\sum_j e^{x_j}}\right),$$

where i represents an $i^{th}$ neuron at the layer, the sigmoid function meets: $f(x)=1/(1+e^x)$, the ReLU function meets: $f(x)=\max(0, x)$, and the tanh function meets: $f(x)=\tanh(x)=(e^x-e^{-x})/(e^x+e^{-x})$.

Figure 7:
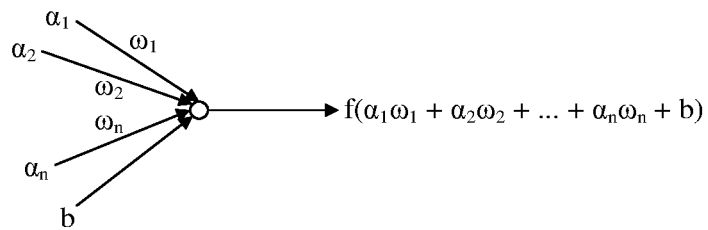
FIG. 7 is a schematic diagram of neuron calculation according to an embodiment of the present disclosure.

Based on the embodiment corresponding to FIG. 6, for example, FIG. 7 is a schematic diagram of a neuron calculation according to an embodiment of the present disclosure. As shown in FIG. 7, $\alpha_1, \alpha_2, \ldots, \alpha_n$ represents n input values, $\omega_1, \omega_2, \ldots, \omega_n$ on represents a weight on a corresponding connection line, b is a bias, f(·) represents an activation function, and output=$f(\alpha_1\omega_1+\alpha_2\omega_2+\ldots+\alpha_n\omega_n+b)$.

Based on the embodiment described in FIG. 6 or FIG. 7, with reference to the neural network shown in FIG. 4 or FIG. 5, it may be learned that after linear transformation is performed on neurons at each layer of the neural network to obtain a linear result, an activation function is added to convert the linear result. After the linear result passes through a plurality of layers of neural networks, the finally obtained output is a complex nonlinear function.

The output of the neural network may be calculated layer by layer according to the method shown in FIG. 6 or FIG. 7, or may be represented by a matrix in a recursive manner.

Figure 8:
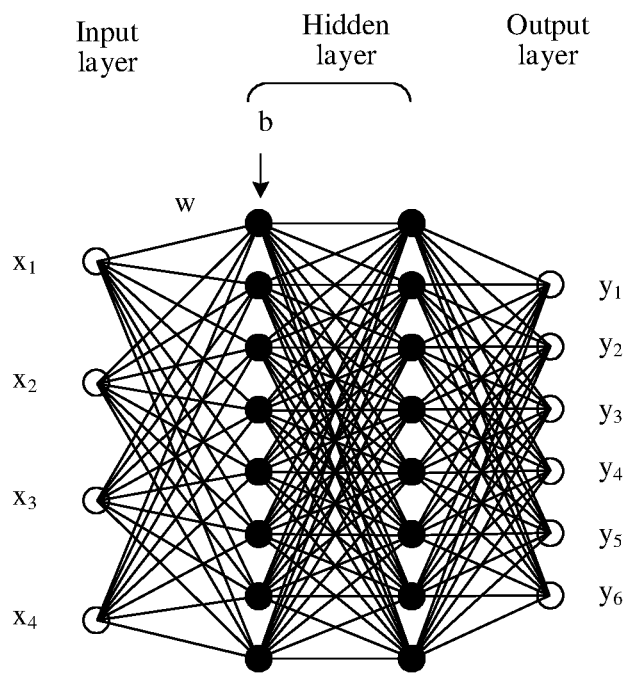
FIG. 8 is a schematic diagram of a structure of a fully connected neural network according to an embodiment of the present disclosure.

For example, FIG. 8 is a schematic diagram of a structure of a fully connected neural network according to an embodiment of the present disclosure. The fully connected neural network may be referred to as a multilayer perceptron (MLP). As shown in FIG. 8, the MLP includes one input layer, one output layer, and two hidden layers. The input layer includes four neurons, the hidden layers include 16 neurons, and the output layer includes six neurons.

In the neural network shown in FIG. 8, an input of the neural network is $x=[x_1, x_2, x_3, x_4]$, w is a weight matrix on a corresponding connection line, and b is a bias vector. Output h of a neuron at a lower layer may be obtained by using linear results obtained by all neurons at an upper layer connected to the neural network and by using an activation function, and h=f(wx+b). Therefore, the output of the neural network may be recursively represented as $y=f_n(w_n f_{n-1}(\ldots)+b_n)$, where $y=[y_1, y_2, y_3, y_4, y_5, y_6]$. Optionally, the output layer may have no calculation of the activation function.

The neural network may be understood as a mapping relationship from input data (or an input set) to output data (or an output set). Usually, a training process of the neural network may be understood as a process of obtaining the mapping relationship from random w and b by using training data.

In a possible manner, a training method of the neural network is as follows: Define a loss function, where the loss function is for calculating a difference between an output result and a target result of the neural network, and when the loss function is the smallest, an error between the output result and the target result of the neural network is the smallest. For example, when the loss function is a mean square error function, loss=$(y_{out}-y_{target})^2$, where $y_{out}$ is the output result of the neural network, $y_{target}$ is the target result, and when loss is the smallest, the error between the output result and the target result is the smallest.

The training process of the neural network includes a forward propagation process and a backpropagation process. The forward propagation process of the neural network is a process in which training data is input into the neural network, passes through the hidden layer, and reaches the output layer, and the output result is obtained. Because there is an error between the output result of the neural network and an actual result, the error between the actual result and the output result may be calculated based on the backpropagation process of the neural network by using a cost function, and the error is backpropagated from the output layer to the hidden layer until reaching the input layer, to optimize the neural network. The cost function may be a mean square error (MSE) function or a cross entropy function.

In a possible manner, in the backpropagation process of the neural network, a backpropagation (BP) algorithm may be used. In this way, a weight of the neural network is adjusted based on the error, so that a weight of a latest iteration is an optimal weight.

In the training process of the neural network, a gradient descent algorithm may be used for calculation. The gradient descent algorithm is for calculating a current gradient of the weight, then the weight is made to move forward in a reverse direction of the gradient for a distance, and this step is repeated continuously until the gradient is close to zero. When the gradient is close to zero, the weight of the neural network just reaches a state in which the loss function reaches a minimum value, and the weight in this case is the optimal weight.

In a possible manner, the output result of the neural network is evaluated by using a loss function, the error is backpropagated, and w and b are iteratively optimized by using a gradient descent method until the loss function reaches a minimum value. The loss function may be a mean square error function, a cross entropy loss function, an absolute value loss function, or the like.

Figure 9:
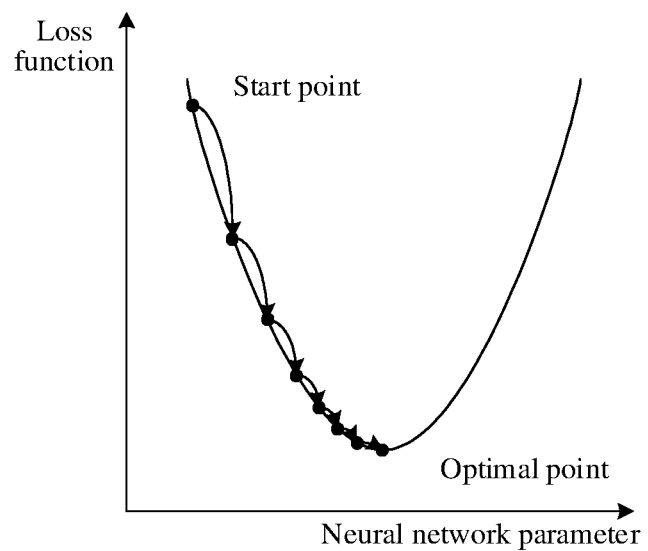
FIG. 9 is a schematic diagram of loss function optimization according to an embodiment of the present disclosure.

For example, FIG. 9 is a schematic diagram of loss function optimization according to an embodiment of the present disclosure. As shown in FIG. 9, from a start point to an optimal point, the gradient descent method is used to iteratively optimize the loss function to the minimum value, so that neural network parameters (w and b) are optimal.

In a possible manner, a gradient descent process may be represented as $$\theta \leftarrow \theta - \eta \frac{\partial L}{\partial \theta},$$

where θ is a to-be-optimized parameter (for example, w or b), L is the loss function, η is a learning rate used to control a gradient descent step.

Because a structure of the neural network is complex, costs of calculating the gradient corresponding to the weight is high. Considering the structure of the neural network, the backpropagation algorithm may be used to calculate the gradient corresponding to the weight. In the backpropagation algorithm, the gradients of the weights are not calculated at one time. Instead, propagation is performed from the output layer to the input layer, and all gradients are calculated layer by layer. For example, a gradient of the output layer is first calculated, then a gradient of a connection weight between the output layer and an intermediate layer (namely, the hidden layer), then a gradient of the intermediate layer, then a gradient of a connection weight between the intermediate layer and the input layer, and finally a gradient of the input layer is calculated.

Figure 10:
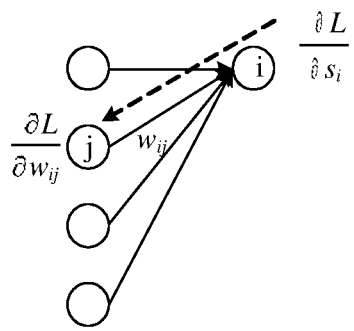
FIG. 10 is a schematic diagram of gradient backpropagation according to an embodiment of the present disclosure.

For example, FIG. 10 is a schematic diagram of gradient backpropagation according to an embodiment of the present disclosure. As shown in FIG. 10, in a backpropagation process, a chain method for calculating a bias is used, that is, a gradient of a weight at a previous layer may be obtained through recursive calculation by using a gradient of a weight at a next layer. A recursive formula may meet the following formula:

$$\frac{\partial L}{\partial w_{ij}} = \frac{\partial L}{\partial s_i} \times \frac{\partial s_i}{\partial w_{ij}},$$

where $w_{ij}$ is a weight of connection between a neuron j and a neuron i, and $s_i$ is an input weighted sum of the neuron i.

After the gradients of the connection weights of neurons in the neural network are obtained, the weight may be updated based on the gradients of the connection weights, to obtain an updated weight. For example, a formula for updating the weight is $W_{new}=W_{old}-lr*E$, where $W_{new}$ is a weight after update, $W_{old}$ is a weight before update, E is a gradient corresponding to the weight before update, lr is a learning rate, lr is used to control a step of gradient descent, and a value of lr is usually 0.1, 0.01, 0.001, 0.0001, 0.00001, or the like.

In a process of implementing efficient transmission in a wireless communication system, machine learning may be used for a feedback process and a control process. For example, UE compresses a full channel matrix by using a coding neural network and feeds back the compressed full channel matrix to a BS. The BS rebuilds channel information by using a decoding neural network. The BS performs intelligent decision, for example, MCS selection, based on the rebuilt channel information by using the machine learning technology. The coding neural network and the decoding neural network are jointly optimized. When an error between an input result of the coding neural network and an output result of the decoding neural network is the smallest, the BS rebuilds the channel information.

However, the rebuilding of the channel information by the BS is not the final purpose of the UE feeding back the channel information. When the UE compresses the feedback information by using the coding neural network, compression overheads of the BS for the rebuilding error are still high, and a subsequent control task may include redundant information. In addition, the BS needs to extract features from the decompressed full channel matrix and then perform intelligent control based on extracted content, which may increase calculation overheads of the BS. Moreover, the feedback information of the UE is not necessarily key information needed by the BS to perform intelligent control. For example, the BS performs intelligent control by using only a part of information in the feedback information of the UE, and other information may limit performance of intelligent control of the BS.

In task-oriented information feedback, feedback overheads may be reduced by performing joint optimization on information feedback on the UE side and intelligent control on the BS side. For example, the UE side encodes the full channel matrix by using the coding neural network and feeds back the encoded full channel matrix to the BS, and the BS performs intelligent decision-making based on the received information by using a control neural network. The coding neural network of the UE and the control neural network of the BS may be used as a whole, and are trained through reinforcement learning or end-to-end training. Alternatively, the coding neural network of the UE and the control neural network of the BS may be considered as two agents, and are trained through multi-agent reinforcement learning.

However, a training manner between the BS and the UE is that one BS and one UE are trained as a pair. Usually, one BS needs to serve a plurality of UEs. If the BS and the plurality of Ues are trained separately, large training overheads may exist in the training process.

Based on this, an embodiment of the present disclosure provides a communication method. Specifically, the communication method may also be referred to as a communication-related neural network training method. The method includes: A second device receives policy related information from M first devices; the second device obtains transmission decisions of the M first devices based on the policy related information by using a second neural network; the second device obtains reward information of the transmission decision; the second device updates the second neural network based on the reward information, and obtains information for updating a first neural network; the second device sends the information for updating the first neural network to the M first devices; a third device receives first update parameter information of the first neural network from the M first devices, and obtains second update parameter information of the first neural network based on the first update parameter information of the first neural network of the M first devices; and the third device sends the second update parameter information of the first neural network to the M first devices, so that the first device can update the first neural network based on the second update parameter information. In the method described in this embodiment, the second update parameter information of the first neural network and the update of the second neural network are obtained in a training process between the third device or the second device and the M first devices. Compared with overheads of training the third device or the second device with the M first devices to obtain the second update parameter information and update the second neural network, training overheads of the first device and the second device or the third device can be reduced, because the second device or the third device does not need to be trained with the M first devices for a plurality of times, but may be trained with the M first devices once to obtain the first update parameter information and update the second neural network.

Figure 11A:
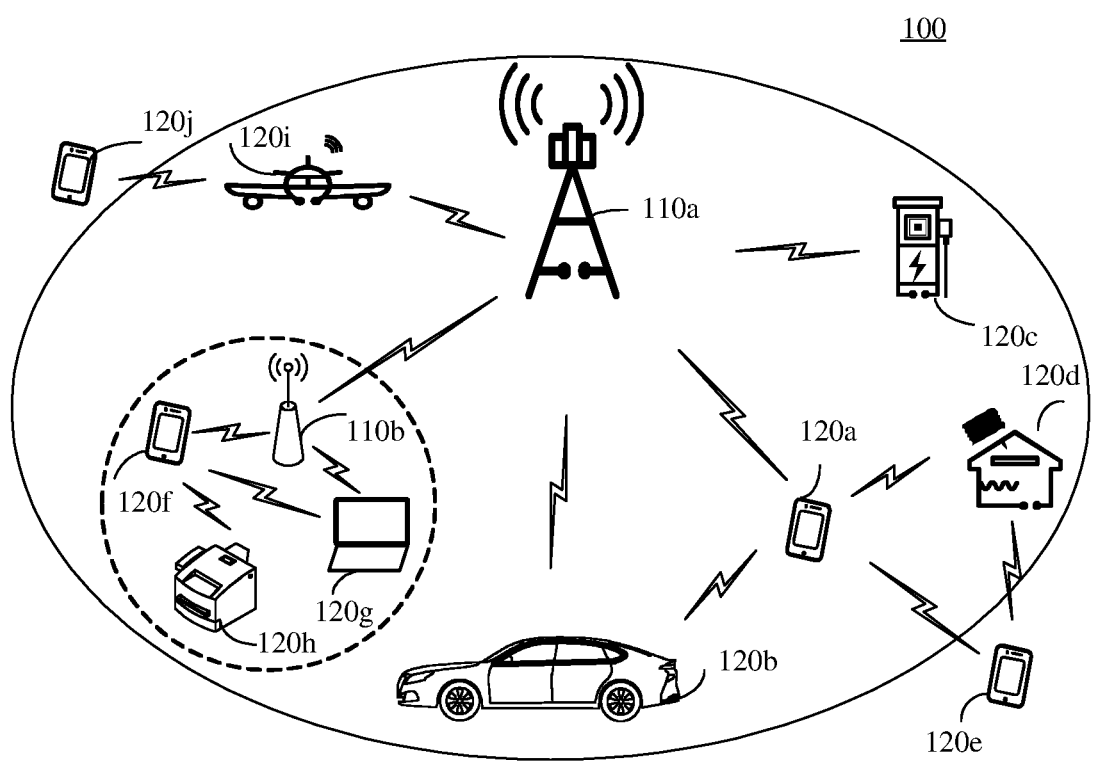
FIG. 11a is a simplified schematic diagram of a wireless communication system according to an embodiment of the present disclosure.

The communication method provided in this embodiment may be used in 5G, 6G, and a future wireless communication system. FIG. 11a is a simplified schematic diagram of a wireless communication system according to an embodiment of the present disclosure. As shown in FIG. 11a, the wireless communication system includes a radio access network 100. The radio access network 100 may be a next generation (for example, 6G or higher release) radio access network, or a conventional (for example, 5G, 4G, 3G, or 2G) radio access network. One or more communication devices (120a to 120j, collectively referred to as 120) may be interconnected or connected to one or more network devices (110a and 110b, collectively referred to as 110) in the radio access network 100. Optionally, FIG. 11a is merely a schematic diagram. The wireless communication system may further include another device, for example, may further include a core network device, a wireless relay device, and/or a wireless backhaul device, and the like, which are not shown in FIG. 11a.

Optionally, in actual application, the wireless communication system may include a plurality of network devices (also referred to as access network devices), or may include a plurality of communication devices. One network device may serve simultaneously one or more communication devices. One communication device may also simultaneously access one or more network devices. Quantities of communication devices and network devices included in the wireless communication system are not limited in embodiments of the present disclosure.

The network device may be an entity, for example, a base station, that is on a network side and that is configured to send or receive a signal. The network device may be an access device by using which a communication device accesses the wireless communication system in a wireless manner. For example, the network device may be a base station. The base station may cover various names in a broad sense, or may be replaced with the following names, for example, a NodeB, an evolved NodeB (eNB), a next generation base station (next generation NodeB, gNB), a relay station, an access point, a transmission point (transmitting and receiving point, TRP), a transmission point (TP), a primary station MeNB, a secondary station SeNB, a multi-standard radio (MSR) node, a home base station, a network controller, an access node, a radio node, an access point (AP), a transmission node, a transceiver node, a baseband unit (BBU), a radio remote unit (RRU), an active antenna unit (AAU), a radio frequency head (RRH), a central unit (CU), a distributed unit (DU), a positioning node, and the like. The base station may be a macro base station, a micro base station, a relay node, a donor node, or the like, or a combination thereof. Alternatively, the base station may refer to a communication module, a modem, or a chip that is disposed in the foregoing device or apparatus. The base station may alternatively be a mobile switching center, a device that implements a base station function in device-to-device (D2D), vehicle-to-everything (V2X), and machine-to-machine (M2M) communication, a network side device in a 6G network, a device that implements a base station function in a future communication system, or the like. The base station may support networks of a same or different access technologies. A specific technology and a specific device form that are used by the network device are not limited in embodiments of the present disclosure. In embodiments of the present disclosure, an example in which a future device is a base station (BS) is used for description.

The base station (BS) may be fixed or mobile. For example, base stations 110a, 110b are static and are responsible for wireless transmission and reception in one or more cells from the communication device 120. A helicopter or drone 120i shown in FIG. 11a may be configured as a mobile base station, and one or more cells may move according to a position of the mobile base station 120i. In other examples, a helicopter or drone (120i) may be configured as a communication device in communication with the base station 110a.

The communication device may be an entity, for example, a mobile phone, that is on a user side and that is configured to receive or transmit a signal. The communication device may be used for connection between persons, objects, and machines. The communication device 120 may be widely used in various scenarios, for example, cellular communication, device-to-device (D2D), vehicle-to-everything (V2X), end-to-end (P2P), machine-to-machine (M2M), machine type communication (MTC), internet of things (IoT), virtual reality (VR), augmented reality (AR), industrial control, self-driving, telemedicine, smart grid, smart home appliance, smart office, smart wearable, smart transportation, smart city, drone, robot, remote sensing, passive sensing, positioning, navigation and tracking, and autonomous delivery and mobility. The communication device 120 may be user equipment (UE), a fixed device, a mobile device, a handheld device, a wearable device, a cellular phone, a smartphone, a session initiation protocol (SIP) phone, a notebook computer, a personal computer, a smart book, a vehicle, a satellite, a global positioning system (GPS) device, a target tracking device, a drone, a helicopter, a flight, a ship, a remote control device, a smart home device, or an industrial device that complies with 3GPP. The communication device 120 may be a wireless device in the foregoing various scenarios or an apparatus disposed in a wireless device, for example, a communication module, a modem, or a chip in the foregoing device. The communication device may also be referred to as a terminal, a terminal device, user equipment (UE), a mobile station (MS), a mobile terminal (MT), or the like. The communication device may alternatively be a communication device in a future wireless communication system. The communication device may be used in a dedicated network device or a general-purpose device. A specific technology and a specific device form that are used by the communication device are not limited in embodiments of the present disclosure. In this embodiment, an example in which the communication device is UE is used for description.

Optionally, the UE may be used as a base station. For example, the UE may act as a scheduling entity that provides a sidelink signal between UE in V2X, D2D, P2P, or the like. As shown in FIG. 11a, a cellular phone 120a and a car 120b communicate with each other by using the sidelink signal. The cellular phone 120a communicates with a smart home device 120d without relaying a communication signal by using the base station 110a.

Optionally, the wireless communication system usually includes cells, each cell includes a base station (BS), and the base station provides a communication service for a plurality of mobile stations (MSs). The base station includes a baseband unit (BBU) and a remote radio unit (RRU). The BBU and the RRU may be disposed at different places. For example, the RRU is remote and disposed in a heavy-traffic area, and the BBU is disposed in a central equipment room. The BBU and the RRU may alternatively be placed in a same equipment room. The BBU and the RRU may alternatively be different components in a same rack.

Figure 11B:
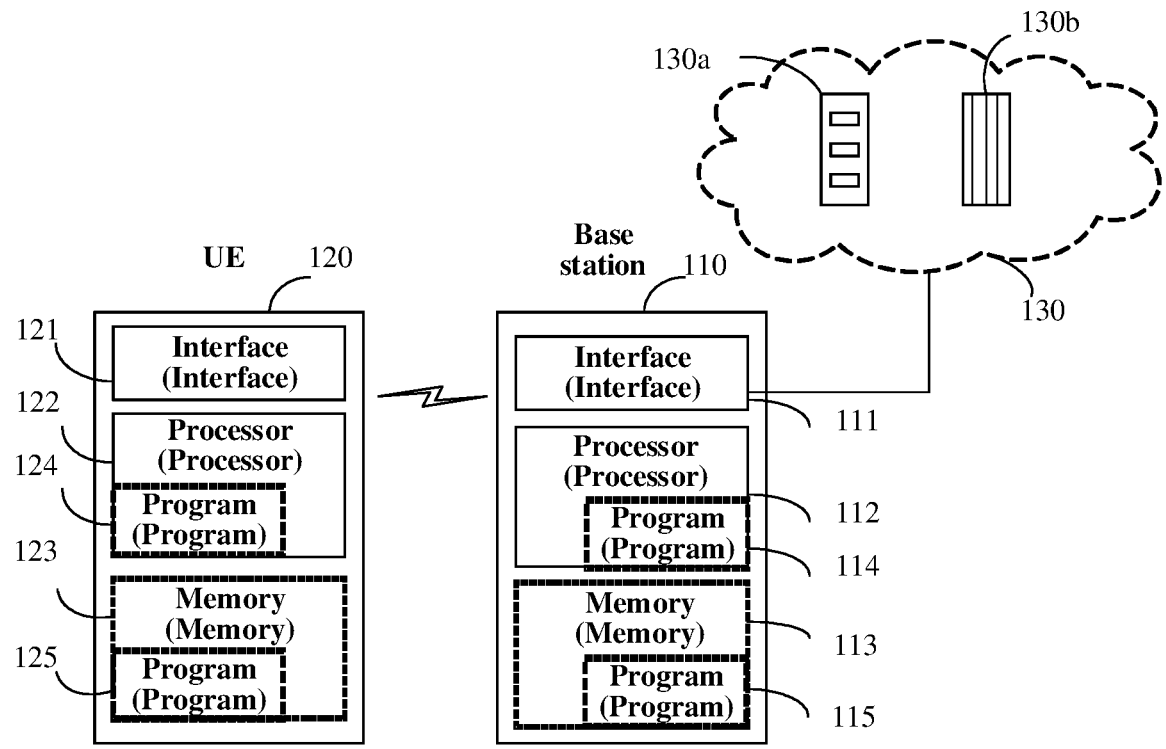
FIG. 11b is another simplified schematic diagram of a wireless communication system according to an embodiment of the present disclosure.

FIG. 11b is another simplified schematic diagram of a wireless communication system according to an embodiment of the present disclosure. For brevity, FIG. 11b shows only a base station 110, UE 120, and a network 130. The base station 110 includes an interface 111 and a processor 112. The processor 112 may optionally store a program 114. The base station 110 may optionally include a memory 113. The memory 113 may optionally store a program 115. The UE 120 includes an interface 121 and a processor 122. The processor 122 may optionally store a program 124. The UE 120 may optionally include a memory 123. The memory 123 may optionally store a program 125. These components work together to provide various functions described in the present invention. For example, the processor 112 and the interface 121 work together to provide a wireless connection between the base station 110 and the UE 120. The processor 122 and the interface 121 function together to implement downlink transmission and/or uplink transmission of the UE 120.

The network 130 may include one or more network nodes 130a and 130b, to provide core network functions. The network nodes 130a and 130b may be next generation (for example, 6G or higher release) core network nodes, or conventional (for example, 5G, 4G, 3G, or 2G) core network nodes. For example, the network nodes 130a and 130b may be access management functions (AMFs), mobility management entities (MMEs), or the like. The network 130 may further include one or more network nodes in a public switched telephone network (PSTN), a packet data network, an optical network, and an Internet Protocol (IP) network. The network 130 may further include a wide area network (WAN), a local area network (LAN), a wireless local area network (WLAN), a wired network, a wireless network, a metropolitan area network, and another network, to enable communication between the UE 120 and/or the base station 110.

The processor (for example, the processor 112 and/or the processor 122) may include one or more processors and be implemented as a combination of computing devices. The processor (for example, the processor 112 and/or the processor 122) may separately include one or more of: a microprocessor, a microcontroller, a digital signal processor (DSP), a digital signal processing device (DSPD), an application-specific integrated circuit (ASIC), a field programmable gate array (FPGA), a programmable logic device (PLD), gating logic, transistor logic, a discrete hardware circuit, a processing circuit, or other proper hardware, firmware, and/or a combination of hardware and software, configured to perform various functions described in the present disclosure. The processor (for example, the processor 112 and/or the processor 122) may be a general-purpose processor or a dedicated processor. For example, the processor 112 and/or the processor 122 may be a baseband processor or a central processing unit. The baseband processor may be configured to process a communication protocol and communication data. The central processing unit may be configured to enable the base station 110 and/or the UE 120 to execute a software program and process data in the software program.

The interface (for example, the interface 111 and/or the interface 121) may be configured to implement communication with one or more computer devices (for example, the UE, the BS, and/or the network node). In some embodiments, the interface may include a wire for coupling a wired connection, or a pin for coupling a wireless transceiver, or a chip and/or a pin for wireless connection. In some embodiments, the interface may include a transmitter, a receiver, a transceiver, and/or an antenna. The interface can be configured to use any available protocol (such as the 3GPP standard).

The program in the present disclosure represents software in a broad sense. Non-limiting examples of the software are program code, a program, a subprogram, an instruction, an instruction set, code, a code segment, a software module, an application program, a software application program, and the like. The program may run in a processor and/or a computer, so that the base station 110 and/or the UE 120 perform various functions and/or processes described in the present disclosure.

The memory (for example, the memory 113 and/or the memory 123) may store data manipulated by the processors 112 and 122 when software is executed. The memories 113 and 123 may be implemented by using any storage technology. For example, the memory may be any available storage medium that can be accessed by the processor and/or the computer. Non-limiting examples of the storage medium include a RAM, a ROM, an EEPROM, a CD-ROM, a removable medium, an optical disc storage, a magnetic disk storage medium, a magnetic storage device, a flash memory, a register, a state storage, a remote mounted memory, a local or remote storage component, or any other medium capable of carrying or storing software, data, or information and accessible by the processor/computer.

The memory (for example, the memory 113 and/or the memory 123) and the processor (for example, the processor 112 and/or the processor 122) may be disposed separately or integrated together. The memory may be configured to be connected to the processor, so that the processor can read information from the memory, and store and/or write information into the memory. The memory 113 may be integrated into the processor 112. The memory 123 may be integrated into the processor 122. The processor (for example, the processor 112 and/or the processor 122) and the memory (for example, the processor 112 and/or the processor 122) may be disposed in an integrated circuit (where for example, the integrated circuit may be disposed in the UE, the base station, or another network node).

Figure 12:
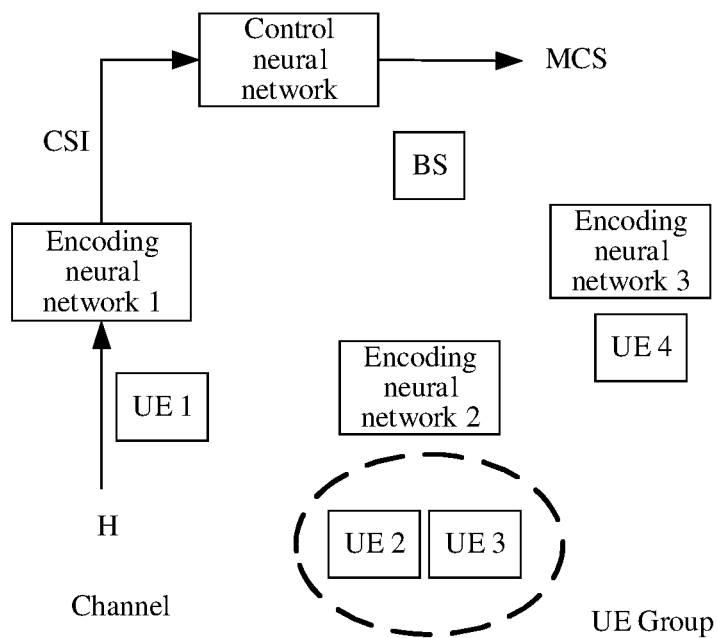
FIG. 12 is a schematic diagram of UE information feedback and BS intelligent control according to an embodiment of the present disclosure.

Based on the embodiment corresponding to FIG. 11a, for example, FIG. 12 is a schematic diagram of UE information feedback and BS intelligent control according to an embodiment of the present disclosure. As shown in FIG. 12, UE 1 may obtain a channel matrix H by estimating a channel, CSI may be obtained based on the channel matrix by using a coding neural network 1 of the UE 1, a control neural network of a BS inputs the CSI, and the BS may perform intelligent control, for example, MCS, based on the CSI.

It can be further learned from FIG. 12 that, FIG. 12 further includes UE 2, UE 3, and UE 4. The UE 2 and the UE 3 are in a same UE group, UE in the group uses a same coding neural network 2, and the UE 4 uses a coding neural network 3.

The following describes some terms in this embodiment.

The second device described in this embodiment may be the network device described above.

The third device described in this embodiment is similar to the second device described in this embodiment. For details, refer to content of the second device described in this embodiment. Details are not described herein again.

The first device described in the solution of the present invention may be the communication device described above.

With reference to FIG. 12, the first device described in this embodiment may be the UE 1, the UE 2, the UE 3, or the UE 4 in FIG. 12, and the second device or the third device described in this embodiment may be the BS in FIG. 12.

The following describes in detail, by using specific embodiments, technical solutions of the present disclosure and how to resolve the foregoing technical problem by using the technical solutions of the present disclosure. The following several specific embodiments may be implemented independently, or may be combined with each other, and same or similar concepts or processes may not be described in detail in some embodiments.

Figure 13:
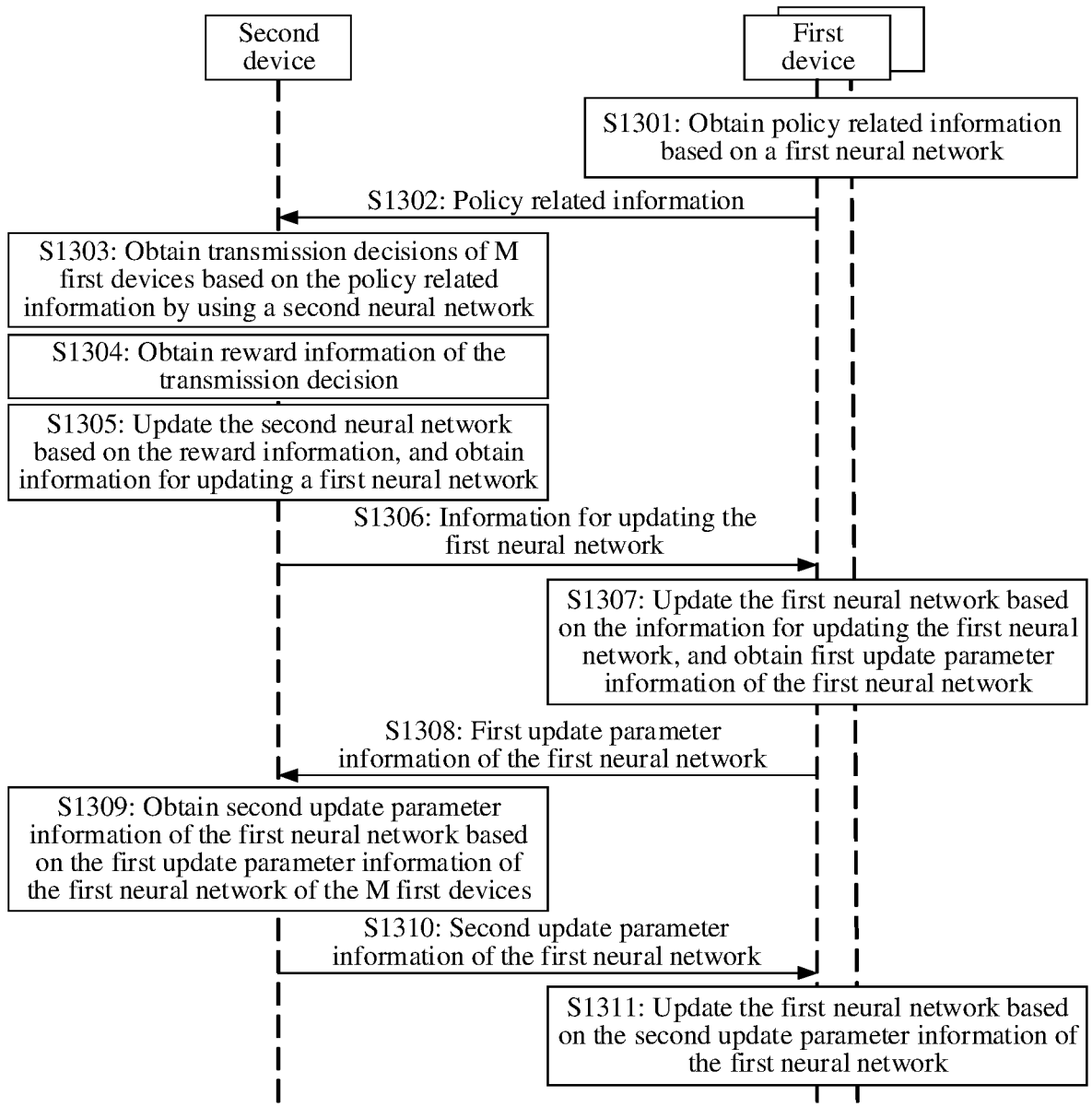
FIG. 13 is a schematic flowchart of a communication method according to an embodiment of the present disclosure.

FIG. 13 is a schematic flowchart of a communication method according to an embodiment of the present disclosure. In this embodiment, because steps performed by M first devices are the same as steps performed by one first device, in this embodiment, steps performed by one first device are used as an example for description. As shown in FIG. 13, the method may include the following steps.

S1301: A first device obtains policy related information based on a first neural network.

Optionally, in this embodiment, the first neural network may be a coding neural network, and is configured to process input limited real channel measurement data, namely, a sample channel state, to obtain a learned channel state, namely, the policy related information. The policy related information is sent to a second device, and is input into a second neural network of the second device, to obtain a decided transmission parameter (or transmission policy). Data transmission between the second device and the first device is performed based on the decided transmission parameter, to obtain reward information, for example, a parameter for evaluating transmission quality. The second neural network and the first neural network are trained based on the reward information, so that match between the transmission parameter and the channel state is better, that is, transmission quality is better. In this way, the trained first neural network and the trained second neural network may together provide, for the first device, a better transmission parameter configuration needed by the first device, and may provide a better transmission parameter configuration for the first device for a new channel state or a needed transmission policy. The parameter for evaluating the transmission quality may be a block error rate or a transmission rate, or may be another parameter. This is not limited herein.

In this embodiment, the real channel measurement data may include one or more of: a channel matrix, a channel impulse response, a channel power, interference power, noise power, reference signal received power (RSRP), reference signal received quality (RSRQ), a transmission decoding result, a buffer size, a delay requirement, a receive beam, a hybrid automatic repeat request (HARQ) feedback state, and the like. The channel matrix reflects a channel impulse response in a MIMO mode. It may be understood that specific content of the real channel measurement data may alternatively be set based on an actual application scenario. This is not specifically limited in this embodiment.

The learned channel state may include processed information that reflects the channel state, for example, one or more of a measurement report (MR), a channel quality indicator (CQI), and the like.

The channel impulse response may include one or more types of the following information: a channel frequency response, a multipath delay spread of a channel, a multipath composition of a channel, a channel amplitude, a channel phase, a real part of the channel impulse response, an imaginary part of the channel impulse response, a channel power delay spectrum, a channel angle power spectrum, or the like.

In this embodiment, the sample channel state is referred to as the channel state, and the learned channel state is referred to as the policy related information.

In this embodiment, the policy related information is related to a decision type of the second device, and the decision type is a transmission parameter type. For example, the decision type may include one or a combination of MCS selection, multiple-input multiple-output (multiple-in multiple-out, MIMO) mode selection, time-frequency resource selection, or a new neural network-based air interface parameter. The MCS selection means selection of one or more of a modulation order, a coding parameter, or the like during transmission, and MIMO mode means selection of a spatial multiplexing mode or selection of a spatial diversity mode. For example, when the policy related information is CNI, the decision type is MCS selection. Types of transmission parameters that are for transmission between the second device and each of M first devices and that are included in different decision types are different. It may be understood that specific content of the transmission parameter may alternatively be set based on an actual application scenario. This is not limited in this embodiment.

S1302: The first device sends the policy related information to the second device.

Correspondingly, the second device may receive the policy related information from the first device.

S1303: The second device obtains transmission decisions of the M first devices based on the policy related information by using the second neural network.

In this embodiment, the M first devices belong to a same group, M is an integer greater than or equal to 2, and the group may be determined based on one or more of a decision type, a device level, a device capability, or a geographical position of a device. For example, if the geographical position is a geographical position that belongs to a same cell, the cell includes a plurality of devices, and channel distribution of devices in the cell is similar, the plurality of devices in the cell may form a group. Optionally, if another device enters the cell, the another device may also be added to a same group with the plurality of devices in the cell.

In this embodiment, the transmission decision may include selection of the modulation order, determining of a channel coding parameter, determining of a MIMO precoding matrix, allocation of a time-frequency resource, adjustment of the new neural network-based air interface parameter, or the like. It may be understood that specific content of the transmission decision may alternatively be set based on an actual application scenario. This is not limited in this embodiment.

In this embodiment, the second device may input the policy related information into the second neural network, to obtain transmission decisions of the M first devices. For ease of description, in the following possible manner, an example in which a transmission decision of one first device is obtained is used for description. A process of obtaining transmission decisions of M first devices is similar to a process of obtaining the transmission decision of one first device.

In a possible manner, when the transmission decision of the first device is obtained based on policy related information of the first device, the second device may input the policy related information of the first device into the second neural network, to obtain the transmission decision of the first device.

For example, the second neural network may obtain the transmission decision of the first device by performing reinforcement learning training by using sample policy related information as an input and a sample transmission decision as an output. In this way, the second device inputs the policy related information of the first device into the second neural network, to obtain the transmission decision of the first device. It may be understood that, an implementation in which the second device obtains the transmission decision of the first device based on the policy related information by using the second neural network may also be set based on an actual application scenario. This is not specifically limited in this embodiment.

In a possible manner, when the transmission decision of the first device is obtained based on policy related information of M first device, the second device may input the policy related information of the M first device into the second neural network, to obtain transmission decisions of the M first devices. It may be understood that the policy related information of the M first devices may be independent of each other, and values of the policy-related information of the M first devices are not limited. A same value may be obtained, or different values may be obtained.

For example, the second neural network may obtain the transmission decision of the first device by performing reinforcement learning training by using sample policy related information as an input and a sample transmission decision as an output. In this way, the second device inputs the policy related information of the N first device into the second neural network, to obtain the transmission decision of the first devices. It may be understood that, an implementation in which the second device obtains the transmission decision of the first device based on the policy related information by using the second neural network may also be set based on an actual application scenario. This is not specifically limited in this embodiment.

S1304: The second device obtains reward information of the transmission decision.

In a possible manner, the second device may obtain the reward information based on the transmission decision. The reward information may include a throughput, a delay, quality of service (QoS), quality of experience (QoE), or the like of a transmission system between the second device and the first device. It may be understood that specific content of the reward information may alternatively be set based on an actual application scenario. This is not limited in this embodiment.

For example, when the transmission decision is selection of the modulation order and the reward information is the throughput, a selected modulation order may be used for MCS selection. In this way, the throughput may be an amount of data that is successfully transmitted in a unit time when the second device performs scheduling based on an MCS corresponding to a downlink channel.

S1305: The second device updates the second neural network based on the reward information, and obtains information for updating the first neural network.

In this embodiment, the second device may update the second neural network based on the reward information and an optimization target function, or it may be understood as that, a connection weight and an offset of each neuron in the second neural network is updated, so that an error of the second neural network is smaller.

In a possible manner, if a parameter of the second neural network is 0, the optimization target function may meet the following formula:

$$\max_{\pi} J(\theta) = \mathbb{E}_{\pi_\theta(s,a)}[R(s, a) + \beta \mathcal{H}(a)],$$

where $J(\theta)$ represents the optimization target function, $\pi_\theta(s,a)$ represents a policy function including the parameter $\theta$ of the second neural network, s represents the policy related information, a represents the transmission decision, $\mathbb{E}_{\pi_\theta(s,a)}$ represents an expectation for all policies, $R(s,a)$ represents the reward information, and the reward information may also include a regular term, for example, mutual information $I(h,m)=H(h)-H(h/m)$ representing a feedback data amount between the policy related information m and the channel h, or mutual information representing message validity between the policy related information m and the transmission decision. $\mathcal{H}(a)$ is a maximum entropy of the transmission decision, and is used to increase an exploration capability of the optimization target function and control an exploration weight of the optimization target function through a coefficient $\beta \in [0,1]$.

Based on the foregoing optimization target function, the second device may update the parameter $\theta$ of the second neural network.

In a possible implementation, the second device first initializes the parameter $\theta$ and a step $\alpha$ (for example, may randomly generate initial values of $\theta$ and the step $\alpha$). The second device may update, by using a gradient rise method and a policy updating function $\theta=\theta+\alpha[\nabla_\theta \log \pi_\theta(s,a)(R(s,a)+\beta \mathcal{H}(a))]$, the parameter $\theta$ of the second neural network based on the policy related information (s in the optimization target function), the transmission decision (a in the optimization target function) determined by using the second neural network, and the reward information ($R(s,a)$ in the optimization target function) obtained by the second device. After a specific quantity of training processes, the parameter of the policy function can be converged.

In this embodiment, the second device may obtain the information for updating the first neural network based on the reward information. For example, when the reward information is a transmission rate difference, the reward information may be represented as $R(s,a)=\text{Rate}(a) \cdot (1-\text{bler})-\text{Rate(baseline)}$, where bler (block error rate, block error rate) is a block error rate calculated during transmission in a period of time, or may be understood as a ratio of a quantity of incorrectly received blocks to a total quantity of sent blocks in a transmission process, and Rate(baseline) may be a transmission rate based on a classic feedback solution. In this way, the information for updating the first neural network may be obtained based on the formula represented by using the reward information, and the information may be a block error rate when the first device receives data blocks.

S1306: The second device sends the information for updating the first neural network to the M first devices.

Correspondingly, the M first devices may receive the information for updating the first neural network from the second device.

S1307: The first device updates the first neural network based on the information for updating the first neural network, and obtains first update parameter information of the first neural network.

In this embodiment, after the first device updates the first neural network based on the information for updating the first neural network, the first device may still continue to obtain the policy related information based on an updated first neural network. In addition, the first device may obtain the first update parameter information from the updated first neural network, and the first update parameter information may be a connection weight between neurons of the first neural network. It may be understood that specific content of the first update parameter information may be set based on an actual application scenario. This is not limited in this embodiment.

S1308: The first device sends the first update parameter information of the first neural network to the second device.

Correspondingly, the second device may receive the first update parameter information of the first neural network from the first device.

S1309: The second device receives the first update parameter information of the first neural network from the M first devices, and obtains second update parameter information of the first neural network based on the first update parameter information of the first neural network of the M first devices.

In this embodiment, the second update parameter information of the first neural network is used by the first device to update the first neural network, and the second update parameter information is related to the first update parameter information of the first neural network sent by the first device and first update parameter information of at least one first neural network of another first device than the first device. The first device and a fifth device are in a same group.

For example, the second update parameter information may be obtained based on a function of the first update parameter information that is of the first neural network and that is sent by the first device and the first update parameter information of the at least one first neural network of the another first device than the first device. The function may include a sum function, a maximum value function, a median function, a weighted average function, or the like. It may be understood that specific content of the function may alternatively be set based on an actual application scenario. This is not limited in this embodiment.

It should be noted that, if the second update parameter information of the first neural network of the first device is the same as the first update parameter information of the first neural network, the first neural network may not be updated. Therefore, the second update parameter information of the first neural network is obtained with reference to the first update parameter information of the first neural network of the first device and the first update parameter information of the at least one first neural network of another first device than the first device, so that a case in which the first neural network is not updated can be avoided. In addition, a plurality of first devices in a same group use the same second update parameter information of the first neural network, so that complexity of neural networks of the plurality of first devices is reduced. In other words, parameters of the first neural network of the plurality of first devices are fused at the second device, so that the fused parameters of the first neural network may be applicable to a plurality of samples of first devices. This avoids that each of the first devices trains all samples of the first neural network, and reduces training complexity and overheads.

S1310: The second device sends the second update parameter information of the first neural network to the M first devices.

Correspondingly, the M first devices may receive the second update parameter information of the first neural network from the second device.

S1311: The first device updates the first neural network based on the second update parameter information of the first neural network.

In a possible manner, when the second update parameter information is connection weights of all connection lines in the second neural network, the first device may update the connection weights in the first neural network based on a weight updating formula. In the weight updating formula, the second update parameter information is an updated weight. For a specific manner, refer to the descriptions of the foregoing content. Details are not described herein again.

In this embodiment, content described in S1309 and S1310 is performed by the second device. Optionally, the content described in S1309 and S1310 may alternatively be performed by a third device. The third device and the second device are different devices. An implementation in which the third device performs the steps is similar to an implementation in which the second device performs the steps. Details are not described herein again.

It should be noted that structures and dimensions of the first neural network of the first device and the second neural network of the second device may be determined by specific tasks. For example, a convolutional neural network may be used for a large quantity of parameter channel matrices obtained in Massive MIMO. In a scenario in which a prediction channel matrix is needed, channel information of a previous period of time may be input, and a long-term and short-term memory cyclic neural network may be used for processing.

It should be noted that, in a training process of the neural network, training related information such as a neural network gradient exchanged between the second device and the first device may be transmitted on a conventional data channel, or a new dedicated logical channel for neural network training may be defined to carry the training related information. For different control tasks, states, actions, and rewards of training may be the same or different, and may result in a need for different neural networks. A task-related indication may be defined, to indicate a neural network for which a reward currently fed back by the first device is used for updating, or a neural network that is selected for feeding back corresponding information.

Based on the above, the second update parameter information of the first neural network and the update of the second neural network are obtained in a training process between the third device or the second device and the M first devices. Compared with overheads of separately training the third device and the second device with the M first devices to obtain the first update parameter information and update the second neural network, training overheads of the first device and the second device or the third device can be reduced, because the second device or the third device does not need to be trained with the M first devices for a plurality of times, but may be trained with the M first devices once to obtain the first update parameter information and update the second neural network.

Figure 14:
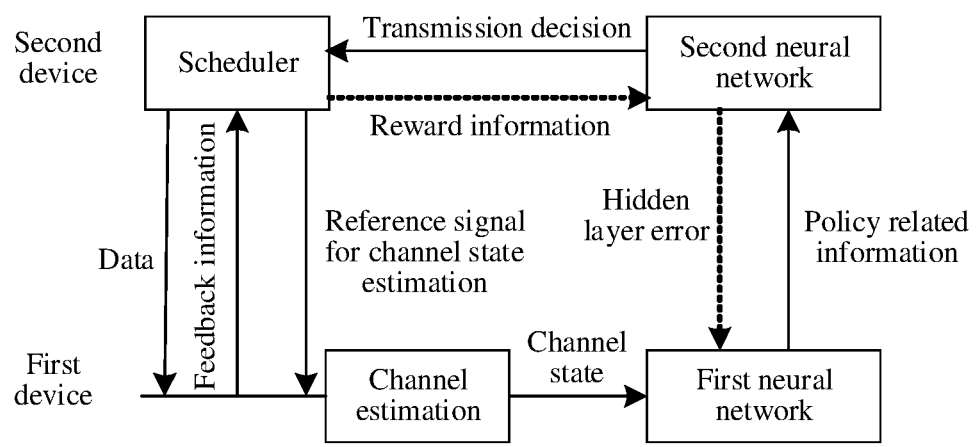
FIG. 14 is a schematic diagram of a united network training framework according to an embodiment of the present disclosure.

Based on the embodiment corresponding to FIG. 13, the first device and the second device may perform joint network training in a reinforcement learning manner. For example, FIG. 14 is a schematic diagram of a joint network training framework according to an embodiment of the present disclosure. In the framework shown in FIG. 14, the first device and the second device may be connected in series and may be considered as an agent, to perform training on the first neural network and the second neural network.

In the agent including the first device and the second device, a current channel environment is considered as a reinforcement learning environment. The first neural network of the first device uses raw data that needs to be fed back as a reinforcement learning state, the transmission decision of the second neural network of the second device is used as a reinforcement learning action, and a system throughput during communication between the first device and the second device is used as reinforcement learning reward information. The reward information is obtained by the second device. Optionally, the reward may alternatively be obtained by the first device, for example, may be QoS or QoE of the first device. In this case, the first device needs to first feed back the reward to the second device, and then perform neural network training.

In the framework shown in FIG. 14, the first neural network of the first device that is obtained through reinforcement learning may be used to process control task-related data (for example, a channel), and generate policy related information to be fed back to the second device. The policy related information is used as an input of the second neural network of the second device to control the transmission decision. In a training process of the second device and the first device, information related to the training process (for example, a gradient of a neural network) may be transmitted on a conventional data channel, or a new dedicated logical channel used for neural network training may be defined.

It should be noted that, for different transmission decisions, training states and actions of the first device and the second device may be the same or different, and therefore different neural networks may need to be used. The second device may alternatively define an indication related to the transmission decision, to indicate a neural network to be selected by the UE for feedback of corresponding information.

Figure 15:
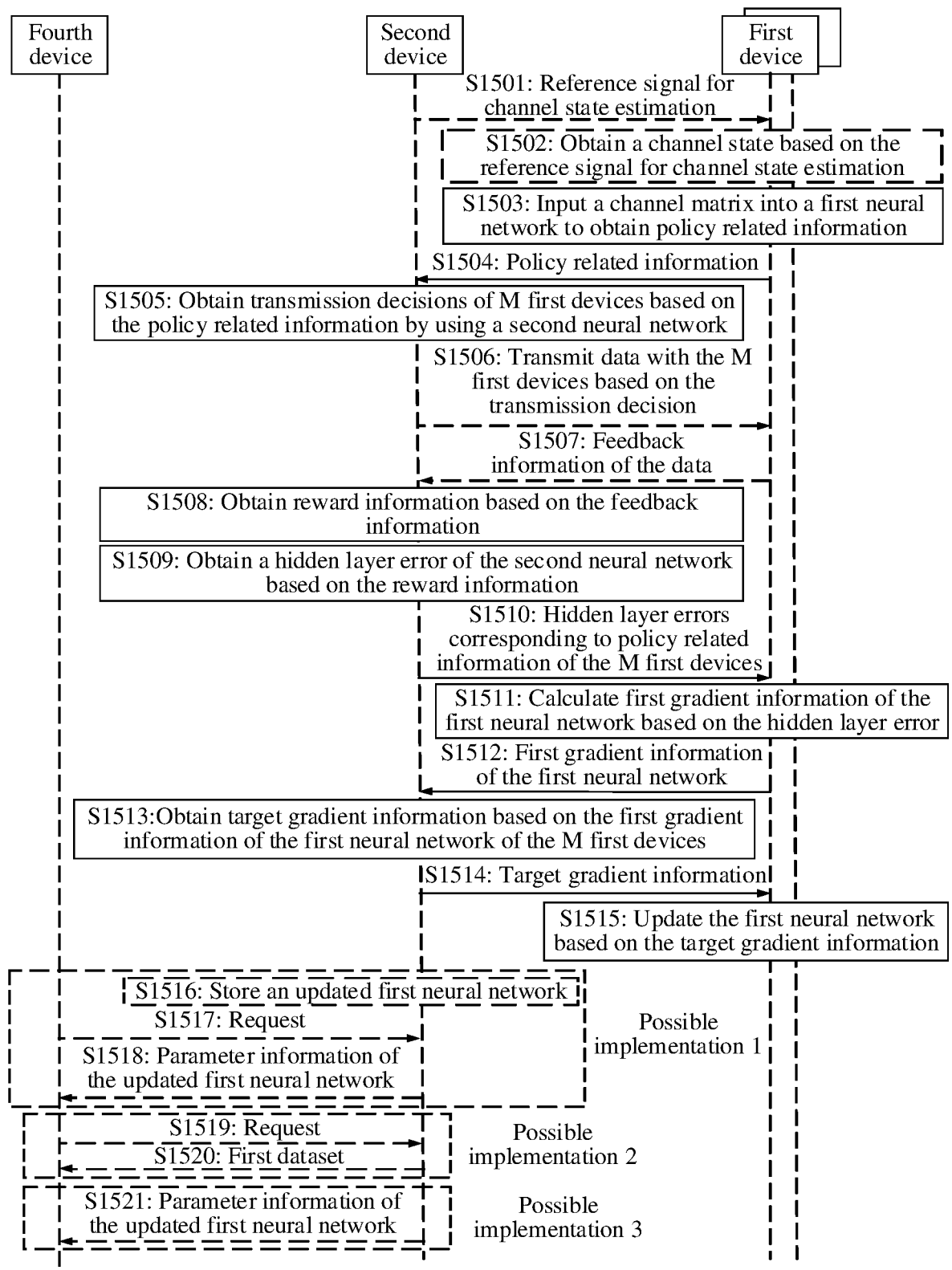
FIG. 15 is a schematic flowchart of a communication method according to an embodiment of the present disclosure.

In the framework shown in FIG. 14, the second neural network of the second device and the first neural network of the first device may be updated online to adapt to a new environment or a new task. For ease of description, the first neural network of the first device and the second neural network of the second device shown in FIG. 14 may be described by using an update process as an example. For example, FIG. 15 is a schematic flowchart of a communication method according to an embodiment of the present disclosure. An interaction process between the first device and the second device shown in FIG. 14 is described in steps of the embodiment shown in FIG. 15. Details are not described herein again.

In the embodiment shown in FIG. 15, because steps performed by M first devices are the same as steps performed by one first device, in this embodiment, steps performed by one first device are used as an example for description. As shown in FIG. 15, the method may include the following steps.

S1501: The second device sends a reference signal for channel state estimation to the M first devices.

In this embodiment, the reference signal for channel state estimation is used by the first device to obtain a channel related status. The channel related status may include a channel quality status. The reference signal for channel state estimation may be a channel state information-reference signal (CSI-RS) or the like. It may be understood that specific content of the reference signal for channel state estimation may be set based on an actual application scenario. This is not limited in this embodiment.

S1502: The first device obtains a channel state based on the reference signal for channel state estimation.

In this embodiment, the channel status may be a result obtained by directly measuring a channel, and may include one or more of a channel matrix, a channel impulse response, processed information (for example, a measurement report (MR)) that reflects the channel state, channel power, interference power, noise power, a signal to interference plus noise ratio, channel quality indicator (CQI), reference signal received power (RSRP), reference signal received quality (RSRQ), and the like. The channel matrix reflects a channel impulse response in a MIMO mode.

The channel impulse response may include one or more types of the following information: a channel frequency response, a multipath delay spread of a channel, a multipath composition of a channel, a channel amplitude, a channel phase, a real part of the channel impulse response, an imaginary part of the channel impulse response, a channel power delay spectrum, a channel angle power spectrum, or the like.

For example, when the reference signal for channel state estimation is the CSI-RS, after receiving the CSI-RS sent by the second device, the first device may measure and estimate a channel parameter of a downlink channel based on the CSI-RS, to obtain a channel matrix of the downlink channel.

S1503: The first device inputs the channel state into the first neural network to obtain the policy related information.

In a possible implementation, when the policy related information is CNI, the first neural network may obtain the CNI by performing reinforcement learning training by using a sample channel state as an input and sample CNI as an output, so that the first device inputs the channel state that is of the downlink channel and that is obtained through measurement and estimation into the first neural network, and the first neural network may output the CNI corresponding to the downlink channel.

S1504: The first device sends the policy related information to the second device.

Correspondingly, the second device receives the policy related information from the first device.

S1505: The second device obtains transmission decisions of the M first devices based on the policy related information by using the second neural network.

S1506: The second device transmits data with the M first devices based on the transmission decision.

In this embodiment, the data may be actual uplink or downlink data in a current communication process between the first device and the second device. For example, the downlink data may include paging data and the like. It may be understood that specific content of the data may be set based on an actual application scenario. This is not limited in this embodiment.

S1507: The first device sends feedback information of the data to the second device.

In this embodiment, the feedback information is feedback information of the M first devices for data transmitted by the M first devices. When one first device is used as an example for description, the feedback information may reflect a status of receiving, by the first device, the data sent by the second device. The status may include whether the first device completely receives the data, whether the first device needs the second device to resend the data, or the like. For example, the feedback information may include a decoding result, a QoS satisfaction status, or the like, the decoding result may include an acknowledgment message (acknowledge, ACK) or a negative acknowledgment (NACK), and the QoS satisfaction status indicates whether data transmission quality, such as a block error rate or a delay, meets a requirement. It may be understood that specific content of the feedback information may alternatively be set based on an actual application scenario. This is not limited in this embodiment.

It should be noted that, when the feedback information is the ACK or the NACK, if there is no uplink scheduling, the first device may send the ACK or the NACK to the second device by using a physical uplink control channel (PUCCH); or if there is uplink scheduling, the first device may send the ACK or the NACK to the second device by using a physical uplink shared channel (PUSCH) or the PUCCH.

S1508: The second device obtains the reward information based on the feedback information.

In a possible manner, when the feedback information is the ACK, the second device may use a transmission rate difference fed back at a single time as the reward information. For example, the reward information may be represented as R(s,a)=Rate(a)·ACK−Rate(baseline), where s is Rate(a)·ACK and represents a current feedback transmission rate, and Rate(baseline) may be a transmission rate based on a classic feedback scheme.

In a possible manner, when the feedback information is the NACK, the second device may use an average transmission rate difference in a period of time as the reward information. For example, the reward information may be represented as R(s,a)=Rate(a)·(1−bler)−Rate(baseline), where bler (block error rate) is a block error rate that is of transmission between the first device and the second device during in a period of time and that is obtained through calculation, and Rate(baseline) may be a transmission rate based on a classic feedback scheme.

Optionally, when the first device does not feed back the feedback information of the data, the second device may calculate the reward information based on a transmission status of the data. For example, the second device calculates the reward information based on a quantity of data packets transmitted to the first device in a unit time.

S1509: The second device obtains a hidden layer error of the second neural network based on the reward information.

In this embodiment, the hidden layer error is an error that is of a first layer parameter of the second neural network and that is obtained based on the second neural network and the reward information. The second device may obtain the hidden layer error based on the reward information by using a method based on a policy gradient when performing backpropagation update of the second neural network, and send the hidden layer error to the first device, to update the first neural network.

S1510: The second device sends the M first devices hidden layer errors corresponding to policy related information of the M first devices.

Correspondingly, the M first device receives the hidden layer errors of the policy related information from the second device.

S1511: The first device calculates first gradient information of the first neural network based on the hidden layer error.

In this embodiment, the first device may obtain the first gradient information of the first neural network through calculation layer by layer from the output layer to the input layer based on the hidden layer error and gradient backpropagation. For a specific implementation, refer to the foregoing descriptions. Details are not described herein again.

S1512: The first device sends the first gradient information of the first neural network to the second device.

Correspondingly, the second device may receive the first gradient information of the first neural network from the first device.

S1513: The second device obtains a target gradient information based on the first gradient information of the first neural network of the M first devices.

In this embodiment, the target gradient information is used by any one of the first devices to update the first neural network, and is related to the first gradient information of the first neural network sent by the first device and first gradient information of at least one first neural network of another first device than the first device.

For example, the target gradient information may be obtained by the second device based on a function of the first gradient information of the first neural network of the M first devices and a function of the first gradient information of the at least one first neural network of the another first device than the first device. The function may include a sum function, a maximum value function, a median function, a weighted average function, or the like. It may be understood that specific content of the function may alternatively be set based on an actual application scenario. This is not limited in this embodiment.

S1514: The second device sends the target gradient information to the M first devices.

Correspondingly, the M first devices may receive the target gradient information from the second device.

S1515: The first device updates the first neural network based on the target gradient information.

In this embodiment, updating the first neural network may be updating a connection weight and an offset of each neuron in the first neural network. When the target gradient information is determined, the connection weight and the offset value of each neuron in the first neural network may be optimized based on the target gradient information by using a gradient descent method, to update the first neural network.

In this embodiment, the fourth device may update the neural network in a manner described in the following steps. For example, a possible implementation 1, a possible implementation 2, or a possible implementation 3 may be used.

The possible implementation 1 includes content described in S1516 to S1518, and specific steps are as follows.

S1516: The second device stores an updated first neural network.

In this embodiment, after the first device updates the first neural network, the second device may store a structure or parameter of the updated first neural network, and the parameter of the updated first neural network may include a connection weight and an offset.

S1517: The second device receives a request from a fourth device.

Correspondingly, the fourth device sends the request to the second device.

S1518: The second device sends parameter information of the updated first neural network to the fourth device according to the request.

The possible implementation 2 includes content described in S1519 and S1520, and specific steps are as follows.

S1519: The second device receives a request from a fourth device.

Correspondingly, the fourth device sends the request to the second device.

S1520: The second device sends a first dataset to the fourth device according to the request.

In this embodiment, the first dataset may be referred to as a sample dataset, and is used by the fourth device to train the neural network. The first dataset may include a set of a plurality of inputs and outputs of the first neural network, and the output may be the policy related information. It may be understood that specific content of the input and output of the first neural network may be set based on an actual application scenario. This is not limited in this embodiment.

In this embodiment, the first dataset is obtained by the second device based on the second update parameter information of the first neural network. For example, after the second device obtains the second update parameter information of the first neural network, the second device may obtain an output by using a random input, and constitute the first dataset by using the random input and the obtained output.

The possible implementation 3 includes content described in S1521, and specific steps are as follows.

S1521: The second device sends parameter information of the updated first neural network to a fourth device.

In this embodiment, the parameter information of the updated first neural network is used by the fourth device to update the neural network, and may include the connection weight and the offset of the first neural network. The fourth device and the first device in a same group may use the same parameter information of the updated first neural network. In this way, based on the parameter information of the updated first neural network, the fourth device updates the neural network by adjusting the parameter information of the neural network.

In this embodiment, content described in S1513 and S1514, S1516 to S1518, S1519 and S1520, and S1521 is performed by the second device. Optionally, the content described in S1513 and S1514, S1516 to S1518, S1519 and S1520, and S1521 may alternatively be performed by a third device. The third device and the second device are different devices. An implementation in which the third device performs the steps is similar to an implementation in which the second device performs the steps. Details are not described herein again.

It should be noted that S1501 and S1502, S1506 and S1507, S1516 to S1518, S1519 and S1520, and S1521 in this embodiment are optional steps. One or more of the optional steps may be set based on an actual application scenario. A sequence of the steps in this embodiment may also be adjusted based on an actual application scenario. This is not specifically limited in this embodiment.

It should be noted that, in this embodiment, to enable the M first devices in the same group to obtain the same updated neural network based on the same target gradient information, structures and parameters of the first neural networks of the M first devices before update need to be the same. For example, the second device may broadcast the structure and the parameter of the neural network to the M first devices.

In conclusion, the target gradient information is obtained in a training process between the second device or the third device and the M first devices. Compared with overheads of training the second device or the third device with the M first devices to obtain the target gradient information, training overheads of the second device or the third device can be reduced, because the second device or the third device does not need to be trained with the M first devices for a plurality of times, but may be trained with the M first devices once to obtain the target gradient information. In addition, the fourth device receives the parameter information of the updated first neural network or the first dataset from the second device, so that the fourth device may obtain the neural network without training, and training overheads of the fourth device can also be reduced.

Figure 16:
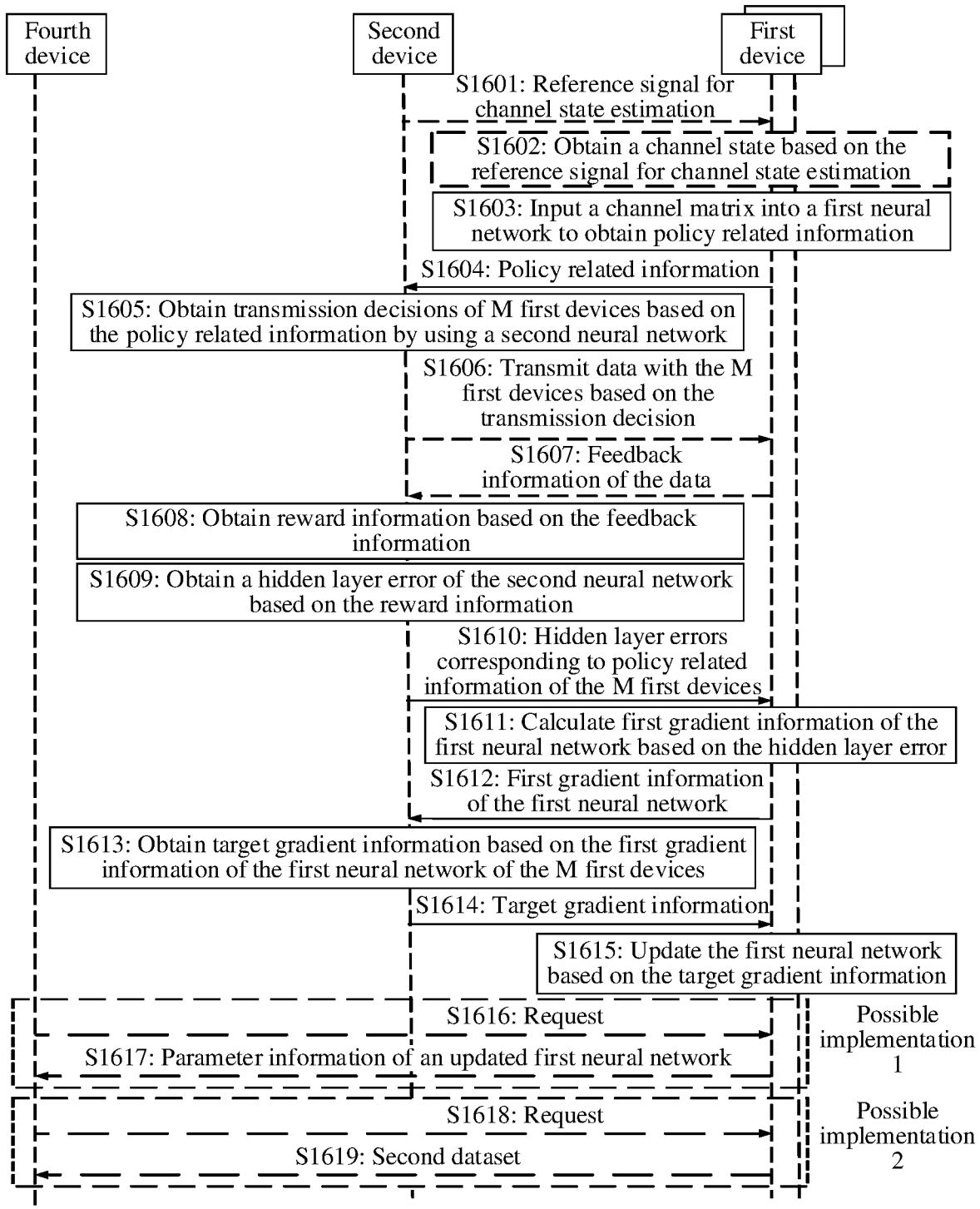
FIG. 16 is a schematic flowchart of a communication method according to an embodiment of the present disclosure.

Based on the embodiment corresponding to FIG. 13, for example, FIG. 16 is a schematic flowchart of a communication method according to an embodiment of the present disclosure. Because steps performed by M first devices are the same as steps performed by one first device, in this embodiment, steps performed by one first device are used as an example for description. As shown in FIG. 16, the method may include the following steps.

S1601: The second device sends a reference signal for channel state estimation to the M first devices.

S1602: The first device obtains a channel state based on the reference signal for channel state estimation.

S1603: The first device inputs the channel state into the first neural network to obtain the policy related information.

S1604: The first device sends the policy related information to the second device.

S1605: The second device obtains transmission decisions of the M first devices based on the policy related information by using the second neural network.

S1606: The second device transmits data with the M first devices based on the transmission decision.

S1607: The first device sends feedback information of the data to the second device.

S1608: The second device obtains the reward information based on the feedback information.

S1609: The second device obtains a hidden layer error of the second neural network based on the reward information.

S1610: The second device sends the M first devices hidden layer errors corresponding to policy related information of the M first devices.

S1611: The first device calculates first gradient information of the first neural network based on the hidden layer error.

S1612: The first device sends the first gradient information of the first neural network to the second device.

S1613: The second device obtains a target gradient information based on the first gradient information of the first neural network of the M first devices.

S1614: The second device sends the target gradient information to the M first devices.

S1615: The first device updates the first neural network based on the target gradient information.

In this embodiment, the fourth device may update the neural network in a manner described in the following steps. For example, a possible implementation 1 or a possible implementation 2 may be used.

The possible implementation 1 includes content described in S1616 and S1617, and specific steps are as follows.

S1616: The first device receives a request from a fourth device.

Correspondingly, the fourth device sends the request to the first device.

S1617: The first device sends parameter information of the updated first neural network to a fourth device according to the request.

The possible implementation 2 includes content described in S1618 and S1619, and specific steps are as follows.

S1618: The first device receives a request from a fourth device.

Correspondingly, the fourth device sends the request to the first device.

S1619: The first device sends a second dataset to the fourth device according to the request.

In this embodiment, the second dataset is used by the fourth device to train the neural network, and includes a set of a plurality of inputs and outputs of the first neural network. For example, the input may be the channel state, and the output may be the policy related information. It may be understood that specific content of the set of inputs and outputs may alternatively be set based on an actual application scenario. This is not limited in this embodiment.

Figure 17:
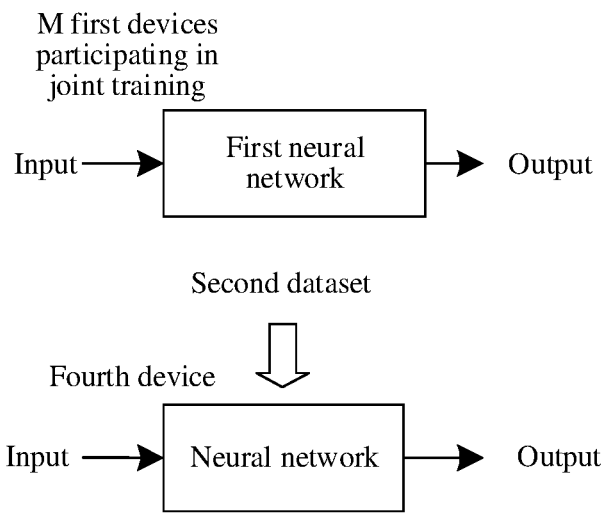
FIG. 17 is a schematic diagram of neural network sharing based on supervised learning according to an embodiment of the present disclosure.

In this embodiment, the second dataset is obtained by the first device based on the updated first neural network. For example, FIG. 17 is a schematic diagram of neural network sharing based on supervised learning according to an embodiment of the present disclosure. As shown in FIG. 17, M first devices participating in joint training obtain an output by using a first neural network by using a random input, and the random input and the obtained output constitute a second dataset. The first device sends the second dataset to the fourth device. In this way, the fourth device may obtain a neural network of the fourth device by using local supervised learning, to obtain an output by using a random input.

In this embodiment, for S1601 to S1615, refer to descriptions corresponding to content of S1501 to S1515 in the embodiment described in FIG. 15. Details are not described herein again.

In this embodiment, content described in S1613 and S1614, S1616 and S1617, and S1618 and S1619 is performed by the second device. Optionally, the content described in S1613 and S1614, S1616 and S1617, and S1618 and S1619 may alternatively be performed by a third device. The third device and the second device are different devices. An implementation in which the third device performs the steps is similar to an implementation in which the second device performs the steps. Details are not described herein again.

It should be noted that S1601 and S1602, S1606 and S1607, S1616 to S1619 in this embodiment are optional steps. One or more of the optional steps may be set based on an actual application scenario. A sequence of the steps in this embodiment may also be adjusted based on an actual application scenario. This is not specifically limited in this embodiment.

It should be noted that, in this embodiment, to enable the M first devices in the same group to obtain the same updated neural network based on the same target gradient information, structures and parameters of the first neural networks of the M first devices before update need to be the same. For example, the second device may broadcast a structure and a parameter of the first neural network to the M first devices.

In conclusion, the target gradient information is obtained in a training process between the second device or the third device and the M first devices. Compared with overheads of training the second device or the third device with the M first devices to obtain the target gradient information, training overheads of the second device or the third device can be reduced, because the second device or the third device does not need to be trained with the M first devices for a plurality of times, but may be trained with the M first devices once to obtain the target gradient information. In addition, the fourth device receives the parameter information of the updated first neural network or the second dataset from the first device, so that the fourth device may obtain the neural network without training, and training overheads of the fourth device can also be reduced.

Figure 18:
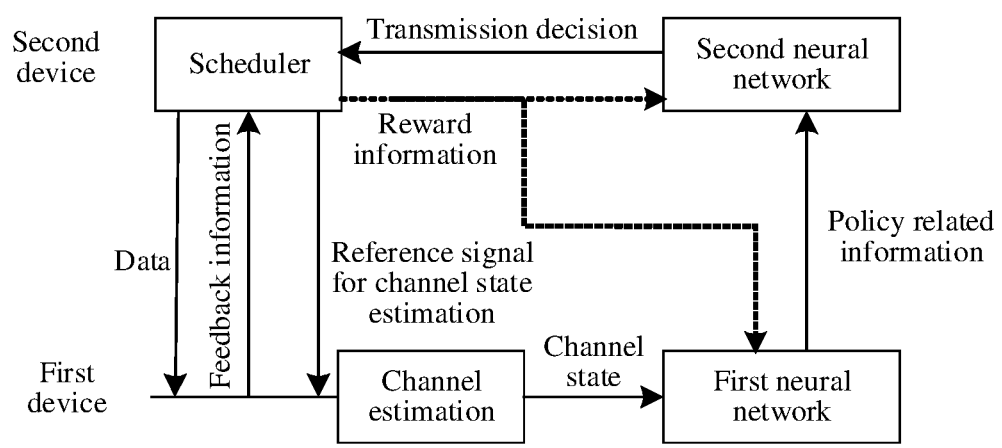
FIG. 18 is a schematic diagram of a multi-agent network training framework according to an embodiment of the present disclosure.

Based on the embodiment corresponding to FIG. 13, the first device and the second device may separately perform information feedback and intelligent control of reinforcement learning. For example, FIG. 18 is a schematic diagram of a multi-agent network training framework according to an embodiment of the present disclosure. In the framework shown in FIG. 18, both the first device and the second device are considered as agents, and the first device end uses an estimated channel as a reinforcement learning state, uses the policy related information as a reinforcement learning action, and uses a decision benefit as a reinforcement learning reward. The second device end uses the policy related information received from the first device as the reinforcement learning state, uses the transmission decision as the reinforcement learning action, and uses the decision benefit as the reinforcement learning reward. Therefore, the first device and the second device may constitute a multi-agent reinforcement learning system.

In the framework shown in FIG. 18, the first neural network of the first device that is obtained through reinforcement learning may be used to process control task-related data (for example, a channel), and generate policy related information to be fed back to the second device. The policy related information is used as an input of the second neural network of the second device to control the transmission decision.

Figure 19:
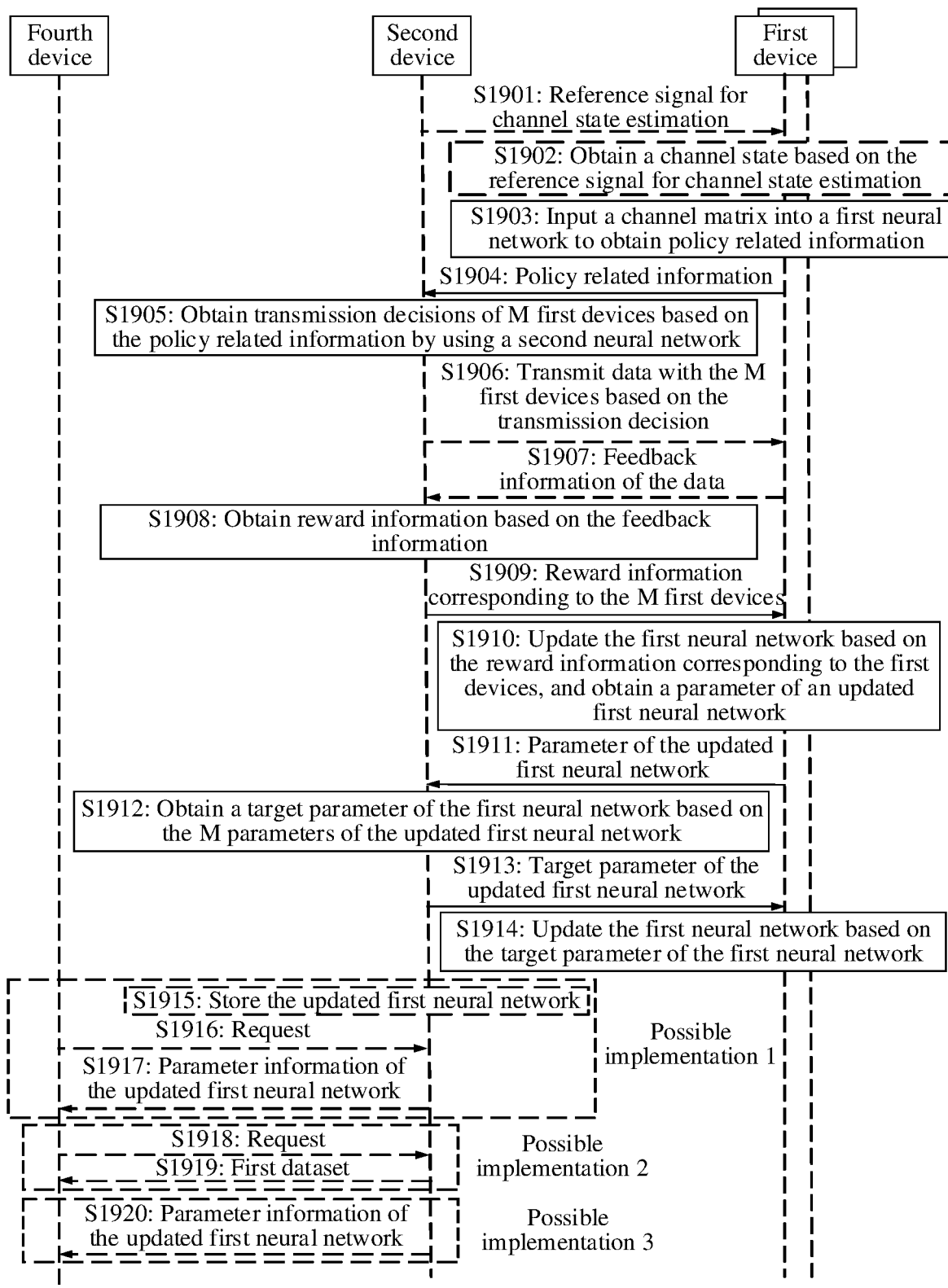
FIG. 19 is a schematic flowchart of a communication method according to an embodiment of the present disclosure.

In the framework shown in FIG. 18, the second neural network of the second device and the first neural network of the first device may be updated online to adapt to a new environment or a new task. For ease of description, the first neural network of the first device and the second neural network of the second device shown in FIG. 18 may be described by using an update process as an example. For example, FIG. 19 is a schematic flowchart of a communication method according to an embodiment of the present disclosure. An interaction process between the first device and the second device shown in FIG. 18 is described in steps of the embodiment shown in FIG. 18. Details are not described herein again.

In the embodiment shown in FIG. 19, because steps performed by M first devices are the same as steps performed by one first device, in this embodiment, steps performed by one first device are used as an example for description. As shown in FIG. 19, the method may include the following steps.

S1901: The second device sends a reference signal for channel state estimation to the M first devices.

S1902: The first device obtains a channel state based on the reference signal for channel state estimation.

S1903: The first device inputs the channel state into the first neural network to obtain policy related information.

S1904: The first device sends the policy related information to the second device.

S1905: The second device obtains transmission decisions (also referred to as transmission parameters) of the M first devices based on the policy related information by using the second neural network.

S1906: The second device transmits data with the M first devices based on the transmission decision.

S1907: The first device sends feedback information of the data to the second device.

S1908: The second device obtains reward information based on the feedback information.

S1909: The second device sends the M first devices the reward information corresponding to the M first devices.

In this embodiment, the reward information is used by any of the first devices to update a first neural network of the first device, and the reward information is related to the second neural network of the second device and the policy related information sent by the first device. For example, the second device may obtain the transmission decision when inputting the policy related information into the second neural network. When the transmission decision is selection of the modulation order and the reward information is the throughput, a selected modulation order may be used for MCS selection. In this way, the throughput may be an amount of data that is successfully transmitted in a unit time when the second device performs scheduling based on an MCS corresponding to a downlink channel.

S1910: The first device updates the first neural network based on the reward information corresponding to the first device, and obtains a parameter of an updated first neural network.

In this embodiment, a process in which the first device updates the first neural network based on the reward information corresponding to the first device is similar to a process in which the second device updates the second neural network based on the reward information in S1305. For details, refer to descriptions of the foregoing steps. Details are not described herein again.

In this embodiment, the parameter of the updated first neural network may include a connection weight and an offset. After the first device updates the first neural network, the first device may obtain the connection weight and the offset. It may be understood that an implementation in which the first device obtains the connection weight and the offset may be set based on an actual scenario. This is not limited in this embodiment.

S1911: The first device sends a parameter of the updated first neural network to the second device.

Correspondingly, the second device may receive the parameter of the updated first neural network from the first device.

S1912: The second device obtains a target parameter of the first neural network based on M parameters of the updated first neural network.

In this embodiment, the target parameter of the first neural network is used by any one of the first devices to update the first neural network, and the target parameter of the first neural network is related to the parameter of the update first neural network sent by the first device and a parameter of at least one updated first neural network of another first device than the first device. The first device and a fifth device are in a same group.

For example, the target parameter of the first neural network may be obtained based on the parameter of the update first neural network sent by the first device and the parameter of the at least one updated first neural network of the another first device than the first device. The function may include a sum function, a maximum value function, a median function, a weighted average function, or the like. It may be understood that specific content of the function may alternatively be set based on an actual application scenario. This is not limited in this embodiment.

For example, the second device performs weighted average calculation on the M parameters of the updated first neural network to obtain the target parameter of the first neural network.

For example, the second device determines a parameter with the largest reward in the M parameters of the updated first neural network to obtain the target parameter of the first neural network. The largest reward may be understood as a bit rate that can be successfully received by the first device based on the updated first neural network when the second device sends a data packet to the first device in a unit time.

It should be noted that, if the target parameter of the first neural network of the first device is the same as the parameter of the updated first neural network, the first neural network may not be updated. Therefore, the target parameter of the first neural network is obtained with reference to the parameter of the updated first neural network sent by the first device and a parameter of at least one updated first neural network of another first device than the first device, so that a case in which the first neural network is not updated can be avoided. In addition, the first device and the fifth device in a same group use the same target parameter of the first neural network, so that complexity of neural networks of the first device and the fifth device is reduced.

S1913: The second device sends the target parameter of the first neural network to the M first devices.

Correspondingly, the M first devices receive the target parameter of the first neural network from the second device.

S1914: The first device updates the first neural network based on the target parameter of the first neural network.

In this embodiment, the first device may obtain a parameter of an updated neural network based on the target parameter of the first neural network, to update the first neural network.

For example, when the target parameter of the first neural network is connection weights of all connection lines in the first neural network, the first device may update the connection weights in the first neural network based on a weight updating formula. In the weight updating formula, the target parameter of the first neural network is an updated weight. For a specific manner, refer to the descriptions of the foregoing content. Details are not described herein again.

In this embodiment, the fourth device may update the neural network in a manner described in the following steps. For example, a possible implementation 1, a possible implementation 2, or a possible implementation 3 may be used.

The possible implementation 1 includes content described in S1915 to S1917, and specific steps are as follows.

S1915: The second device stores an updated first neural network.

S1916: The second device receives a request from a fourth device.

S1917: The second device sends parameter information of the updated first neural network to the fourth device according to the request.

The possible implementation 2 includes content described in S1519 and S1520, and specific steps are as follows.

S1918: The second device receives a request from a fourth device.

S1919: The second device sends a first dataset to the fourth device according to the request.

The possible implementation 3 includes content described in S1920, and specific steps are as follows.

S1920: The second device sends parameter information of the updated first neural network to a fourth device.

In this embodiment, for S1901 to S1908 and S1915 and S1920, refer to descriptions corresponding to content of S1501 to S1508 and S1516 to S1521 in the embodiment shown in FIG. 15. Details are not described herein again.

In this embodiment, content described in S1912 and S1913, S1915 to S1917, S1918 and S1919, and S1920 is performed by the second device. Optionally, the content described in S1912 and S1913, S1915 to S1917, S1918 and S1919, and S1920 may alternatively be performed by a third device. The third device and the second device are different devices. An implementation in which the third device performs the steps is similar to an implementation in which the second device performs the steps. Details are not described herein again.

It should be noted that S1901 and S1902, S1906 and S1907, S1915 to S1920 in this embodiment are optional steps. One or more of the optional steps may be set based on an actual application scenario. A sequence of the steps in this embodiment may also be adjusted based on an actual application scenario. This is not specifically limited in this embodiment.

In conclusion, the target parameter of the first neural network is obtained in a training process between the second device and the M first devices. Compared with overheads of training the second device with the M first devices to obtain the target gradient information, training overheads of the second device can be reduced, because the second device does not need to be trained with the M first devices for a plurality of times, but may be trained with the M first devices once to obtain the target parameter of the first neural network. In addition, the fourth device receives the parameter information of the updated first neural network or the first dataset from the second device, so that the fourth device may update a neural network of the fourth device without training, and training overheads of the fourth device can also be reduced.

Figure 20:
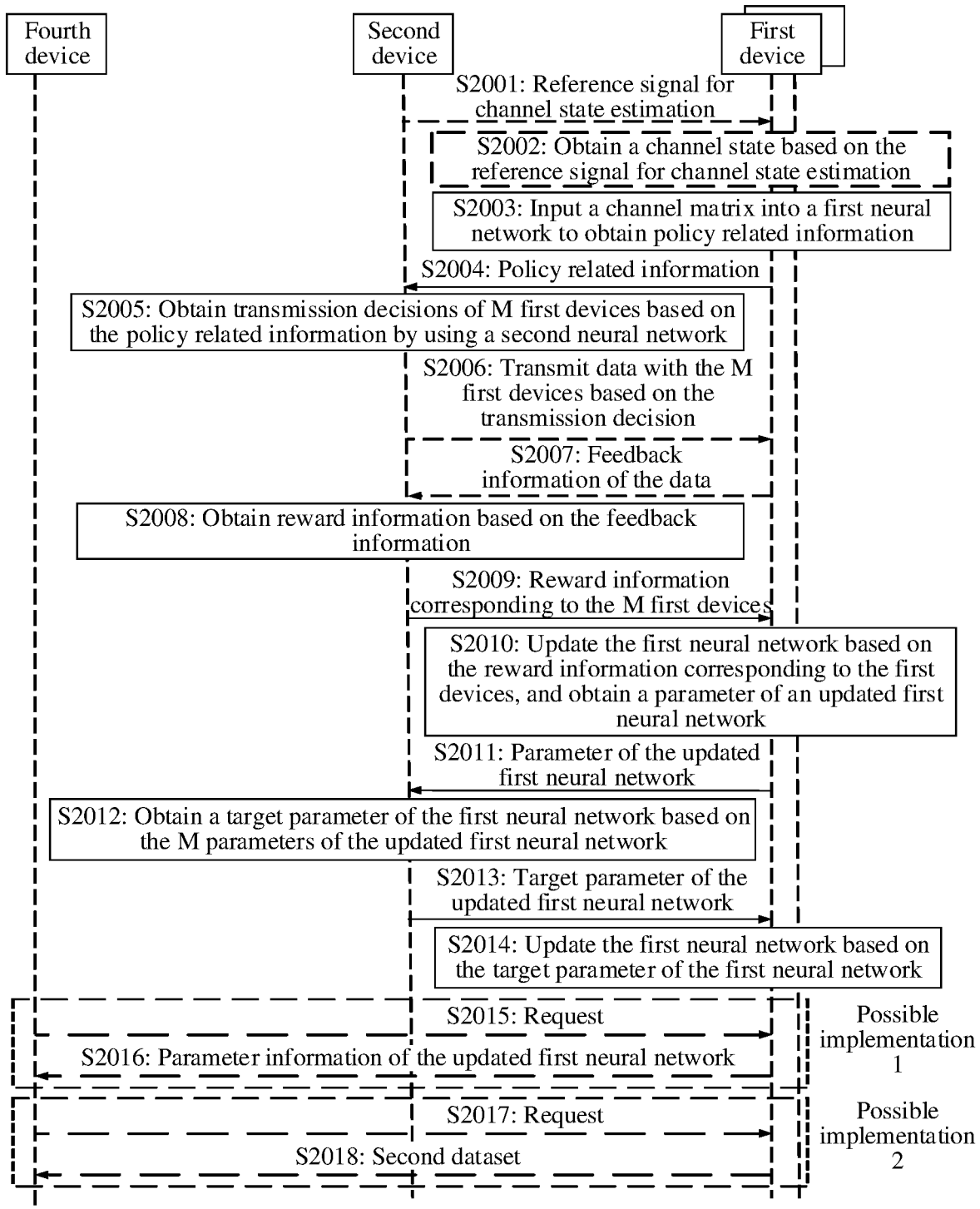
FIG. 20 is a schematic flowchart of a communication method according to an embodiment of the present disclosure.

Based on the embodiment corresponding to FIG. 13, for example, FIG. 20 is a schematic flowchart of a communication method according to an embodiment of this application. In this embodiment, because steps performed by M first devices are the same as steps performed by one first device, in this embodiment, steps performed by one first device are used as an example for description. As shown in FIG. 20, the method may include the following steps.

S2001: The second device sends a reference signal for channel state estimation to the M first devices.

S2002: The first device obtains a channel state based on the reference signal for channel state estimation.

S2003: The first device inputs the channel state into the first neural network to obtain policy related information.

S2004: The first device sends the policy related information to the second device.

S2005: The second device obtains transmission decisions of the M first devices based on the policy related information by using the second neural network.

S2006: The second device transmits data with the M first devices based on the transmission decision.

S2007: The first device sends feedback information of the data to the second device.

S2008: The second device obtains reward information based on the feedback information.

S2009: The second device sends the M first devices the reward information corresponding to the M first devices.

S2010: The first device updates the first neural network based on the reward information corresponding to the first device, and obtains a parameter of an updated first neural network.

S2011: The first device sends a parameter of the updated first neural network to the second device.

S2012: The second device obtains a target parameter of the first neural network based on M parameters of the updated first neural network.

S2013: The second device sends the target parameter of the first neural network to the M first devices.

S2014: The first device updates the first neural network based on the target parameter of the first neural network.

In this embodiment, the fourth device may update the neural network in a manner described in the following steps. For example, a possible implementation 1 or a possible implementation 2 may be used.

The possible implementation 1 includes content described in S2015 and S2016, and specific steps are as follows.

S2015: The first device receives a request from a fourth device.

S2016: The first device sends parameter information of the updated first neural network to a fourth device according to the request.

The possible implementation 2 includes content described in S2017 and S2018, and specific steps are as follows.

S2017: The first device receives a request from a fourth device.

S2018: The first device sends a second dataset to the fourth device according to the request.

In this embodiment, for S2001 to S2008, refer to descriptions corresponding to content of S1501 to S1508 in the embodiment described in FIG. 15, for S2009 to S2014, refer to descriptions corresponding to content of S1909 to S1914 in the embodiment described in FIG. 19, and for S2015 to S2018, refer to descriptions corresponding to content of S1616 to S1619 in the embodiment corresponding to FIG. 16. Details are not described herein again.

In this embodiment, content described in S2012 and S2013, S2015 to S2017, S2018 and 52019, and 52020 is performed by the second device. Optionally, the content described in S2012 and S2013, S2015 to S2017, S2018 and 52019, and 52020 may alternatively be performed by a third device. The third device and the second device are different devices. An implementation in which the third device performs the steps is similar to an implementation in which the second device performs the steps. Details are not described herein again.

It should be noted that S2001 and S2002, S2006 and S2007, S2015 to S2018 in this embodiment are optional steps. One or more of the optional steps may be set based on an actual application scenario. A sequence of the steps in this embodiment may also be adjusted based on an actual application scenario. This is not specifically limited in this embodiment.

In conclusion, the target parameter of the first neural network is obtained in a training process between the second device or the third device and the M first devices. Compared with overheads of training the second device or the third device with the M first devices to obtain the target gradient information, training overheads of the second device or the third device can be reduced, because the second device or the third device does not need to be trained with the M first devices for a plurality of times, but may be trained with the M first devices once to obtain the target parameter of the first neural network. In addition, the fourth device receives the parameter information of the updated first neural network or the second dataset from the first device, so that the fourth device may update a neural network of the fourth device without training, and training overheads of the fourth device can also be reduced.

The foregoing describes the methods in embodiments of the present disclosure with reference to FIG. 13 to FIG. 20. The following describes communication apparatuses that are provided in embodiments of the present disclosure and that perform the foregoing methods. A person skilled in the art may understand that the methods and the apparatuses may be mutually combined and referenced. The communication apparatuses provided in embodiments of the present disclosure may perform the steps performed by the first device, the second device, or the third device in the foregoing communication methods.

Figure 21:
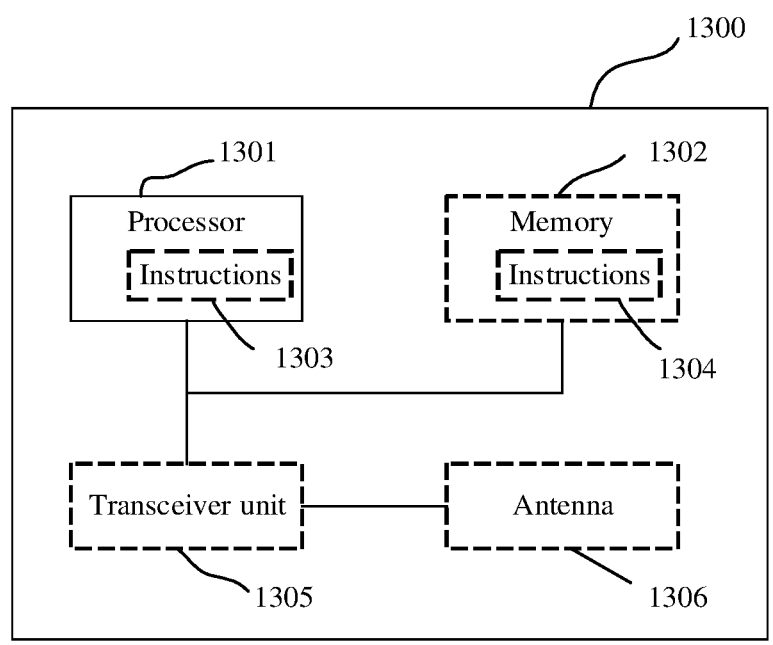
FIG. 21 is a schematic diagram of a structure of a communication apparatus according to an embodiment of the present disclosure.

For example, FIG. 21 is a schematic diagram of a structure of a communication apparatus 1300 according to an embodiment of the present disclosure. The communication apparatus 1300 may be configured to implement the method described in the foregoing method embodiments. Refer to the descriptions in the foregoing method embodiments. The communication apparatus 1300 may be a chip, an access network device (for example, a base station), a terminal, a core network device (for example, an AMF, or an AMF and an SMF), another network device, or the like.

The communication apparatus 1300 includes one or more processors 1301. The processor 1301 may be a general-purpose processor, a dedicated processor, or the like. For example, the processor 1301 may be a baseband processor or a central processing unit. The baseband processor may be configured to process a communication protocol and communication data. The central processing unit may be configured to: control an apparatus (for example, a base station, a terminal, an AMF, or a chip), execute a software program, and process data of the software program. The apparatus may include a transceiver unit, configured to input (receive) and output (send) a signal. For example, the apparatus may be a chip, and the transceiver unit may be an input and/or output circuit or a communication interface of the chip. The chip may be used for a terminal, an access network device (for example, a base station), or a core network device. For another example, the apparatus may be a terminal or an access network device (for example, a base station), and the transceiver unit may be a transceiver, a radio frequency chip, or the like.

The communication apparatus 1300 includes the one or more processors 1301, and the one or more processors 1301 may implement the method performed by the first device, the second device, or the third device in the embodiments shown in FIG. 13 to FIG. 37.

In an example embodiment, the communication apparatus 1300 is configured to: receive, from the second device, information for updating the first neural network, and obtain policy related information based on the first neural network. Functions of the component may be implemented by the one or more processors. For example, the one or more processors may perform sending by using a transceiver, an input/output circuit, or an interface of a chip. Refer to related descriptions in the foregoing method embodiments.

In an example embodiment, the communication apparatus 1300 includes a component (means) configured to send the information for updating the first neural network to M first devices, and a component (means) configured to generate the information for updating the first neural network. Refer to related descriptions in the foregoing method embodiments. For example, the one or more processors may perform receiving by using a transceiver, an input/output circuit, or an interface of a chip.

Optionally, the processor 1301 may further implement another function in addition to the method in the embodiments shown in FIG. 13 to FIG. 37.

Optionally, in an optional design, the processor 1301 may alternatively include instructions 1303, and the instructions may be executed on the processor, so that the communication apparatus 1300 performs the method described in the foregoing method embodiments.

In another possible design, the communication apparatus 1300 may further include a circuit, and the circuit may implement a function of the first device, the second device, or the third device in the foregoing method embodiments.

In still another possible design, the communication apparatus 1300 may include one or more memories 1302. The memory stores instructions 1304, and the instructions may be executed on the processor, so that the communication apparatus 1300 performs the method described in the foregoing method embodiments. Optionally, the memory may further store data. Optionally, the processor may also store instructions and/or data. For example, the one or more memories 1302 may store the policy related information described in the foregoing embodiments, or other information such as reward information in the foregoing embodiments. The processor and the memory may be separately disposed, or may be integrated together.

In yet another possible design, the communication apparatus 1300 may further include a transceiver unit 1305 and an antenna 1306, or may include a communication interface. The transceiver unit 1305 may be referred to as a transceiver machine, a transceiver circuit, a transceiver, or the like, and is configured to implement a transceiver function of the communication apparatus by using the antenna 1306. The communication interface (not shown in the figure) may be used for communication between the first device and the second device, or between the first device and the third device. Optionally, the communication interface may be a wired communication interface, for example, an optical fiber communication interface.

The processor 1301 may be referred to as a processing unit, and controls an apparatus (for example, a terminal, a base station, or an AMF).

The present disclosure further provides a communication system, including one or a combination of the foregoing one or more first devices, one or more second devices, and a third device.

It should be understood that, the processor in embodiments of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of the present disclosure may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example, and not limitative descriptions, random access memories (RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When the software is used for implementation, all or some of the foregoing embodiments may be implemented in a form of a computer program product. The computer program product includes one or more computer instructions or computer programs. When the computer instructions or the computer programs are loaded and executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner, for example, optical fiber, or a wireless manner, for example, infrared, radio, or microwave. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, units and algorithm steps in the examples described with reference to embodiments disclosed in this specification can be implemented by electronic hardware or a combination of computer software and electronic hardware. Whether functions are performed in a hardware or software manner depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in the present disclosure, it should be understood that the disclosed system, communication apparatus, and method may be implemented in other manners. For example, the described apparatus embodiment is merely an example. For example, division may be performed differently in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve objectives of the solutions of the embodiments.

In addition, functional units in embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in the present disclosure essentially, the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
   receiving, by a second device or a chip for the second device, policy related information from M first devices, wherein M is an integer greater than or equal to 2;
   obtaining, by the second device or the chip for the second device, transmission decisions of the M first devices based on the policy related information by using a second neural network;
   obtaining, by the second device or the chip for the second device, reward information of the transmission decision;
   obtaining, by the second device or the chip for the second device, a hidden layer error of the second neural network based on the reward information, wherein the hidden layer error is an error of a first layer parameter of the second neural network that is obtained based on the second neural network and the reward information;
   updating, by the second device or the chip for the second device, the second neural network based on the reward information, and obtaining information for updating a first neural network, wherein the information for updating the first neural network comprises the hidden layer error corresponding to the policy related information of the M first devices;
   sending, by the second device or the chip for the second device, the information for updating the first neural network to the M first devices, wherein the first neural network is for obtaining the policy related information of the M first devices;
   receiving, by a third device or a chip for the third device, first update parameter information of the first neural network from the M first devices, and obtaining second update parameter information of the first neural network based on the first update parameter information of the first neural network of the M first devices, wherein the third device and the second device are a same device or different devices; and
   sending, by the third device or the chip for the third device, the second update parameter information of the first neural network to the M first devices, wherein the second update parameter information of the first neural network is related to M pieces of first update parameter information of the first neural network sent by the M first devices.

2. The method according to claim 1, wherein the policy related information is related to a decision type of the second device, and different decision types comprise different types of transmission parameters for transmission between the second device and the M first devices.

3. The method according to claim 2, wherein the decision type comprises modulation and coding scheme (MCS) selection or multiple-input multiple-output (MIMO) mode selection.

4. The method according to claim 1, wherein the second update parameter information of the first neural network is a function of the first update parameter information of the first neural network of the M first devices.

5. The method according to claim 1, wherein the first update parameter information of the first neural network comprises first gradient information of the first neural network, and the second update parameter information of the first neural network comprises target gradient information;
the sending, by the second device or the chip for the second device, the information for updating the first neural network to the M first devices comprises:
obtaining, by the second device or the chip for the second device, a hidden layer error of the second neural network based on the reward information, for each of the M first devices, wherein the hidden layer error corresponds to policy related information of a respective first device; and
sending, by the second device or the chip for the second device, the respective hidden layer errors to the corresponding M firsts devices;
the receiving, by a third device, first update parameter information of the first neural network from the M first devices, and obtaining second update parameter information of the first neural network based on the first update parameter information of the first neural network of the M first devices comprises:
receiving, by the third device or the chip for the third device, the first gradient information of the first neural network of the M first devices from the M first devices; and
obtaining, by the third device or the chip for the third device, the target gradient information based on the first gradient information of the first neural network of the M first devices; and
the sending, by the third device or the chip for the third device, the second update parameter information of the first neural network to the M first devices comprises:
sending, by the third device or the chip for the third device, the target gradient information to the M first devices, wherein the target gradient information is used by any one of the M first devices to update the first neural network.

6. The method according to claim 1, wherein the M first devices belong to a same group, and the group is determined based on one or more of a decision type, a device level, a decoding capability, or a geographical position of each of the M first devices.

7. The method according to claim 1, further comprising:
storing, by the third device or the chip for the third device, the updated first neural network;
receiving, by the third device or the chip for the third device, a request from a fourth device; and
sending, by the third device or the chip for the third device, parameter information of the updated first neural network to the fourth device according to the request.

8. The method according to claim 1, further comprising:
sending, by the third device or the chip for the third device, parameter information of the updated first neural network to a fourth device.

9. The method according to claim 1, further comprising:
receiving, by the third device or the chip for the third device, a request from a fourth device; and
sending, by the third device or the chip for the third device, a first dataset to the fourth device according to the request, wherein the first dataset is obtained by the third device or the chip for the third device based on the second update parameter information of the first neural network, the first dataset comprises a set of a plurality of inputs and outputs of the first neural network, the output is the policy related information, and the first dataset is used by the fourth device to train a neural network.

10. The method according to claim 1, further comprising:
sending, by the second device or the chip for the second device, a reference signal for channel state estimation to the M first devices, wherein the reference signal is related to the policy related information.

11. The method according to claim 1, wherein the obtaining, by the second device or the chip for the second device, reward information of the transmission decision comprises:
transmitting, by the second device or the chip for the second device, data with the M first devices based on the transmission decision;
receiving, by the second device or the chip for the second device, feedback information of the M first devices for the data transmitted by the M first devices; and
obtaining, by the second device or the chip for the second device, the reward information based on the feedback information.

12. The method according to claim 1, wherein the policy related information comprises channel negotiation information (CNI).

13. A communication method comprising:
receiving, by a second device or a chip for the second device, policy related information from M first devices, wherein M is an integer greater than or equal to 2,
obtaining, by the second device or the chip for the second device, transmission decisions of the M first devices based on the policy related information by using a second neural network;
obtaining, by the second device or the chip for the second device, reward information of the transmission decision;
updating, by the second device or the chip for the second device, the second neural network based on the reward information, and obtaining information for updating a first neural network;
sending, by the second device or the chip for the second device, the information for updating the first neural network to the M first devices, wherein the first neural network is for obtaining the policy related information of the M first devices;
receiving, by a third device or a chip for the third device, first update parameter information of the first neural network from the M first devices, and obtaining second update parameter information of the first neural network based on the first update parameter information of the first neural network of the M first devices, wherein the third device and the second device are a same device or different devices; and
sending, by the third device or the chip for the third device, the second update parameter information of the first neural network to the M first devices, wherein the second update parameter information of the first neural network is related to M pieces of the first update parameter information of the first neural network sent by the M first devices,
wherein the information for updating the first neural network comprises the reward information corresponding to the M first devices, the first update parameter information of the first neural network comprises a parameter of an updated first neural network, and the second update parameter information of the first neural network comprises a target parameter of the first neural network;

the sending, by the second device or the chip for the second device, the information for updating the first neural network to the M first devices comprises:

sending, by the second device or the chip for the second device, the reward information corresponding to the M first devices to the M first devices, wherein the reward information is used by each of the M first devices to update a first neural network of the first device;

the receiving, by a third device, first update parameter information of the first neural network from the M first devices, and obtaining second update parameter information of the first neural network based on the first update parameter information of the first neural network of the M first devices comprises:

receiving, by the third device or the chip for the third device, M parameters of the updated first neural network from the M first devices; and obtaining, by the third device or the chip for the third device, a target parameter of the first neural network based on the M parameters of the updated first neural network; and the sending, by the third device or the chip for the third device, the second update parameter information of the first neural network to the M first devices comprises:

sending, by the third device or the chip for the third device, the target parameter of the first neural network to the M first devices, wherein the target parameter of the first neural network is used by any one of the M first devices to update the first neural network.

14. A communication apparatus, comprising at least one processor, and at least one memory storing instructions that, when executed by the at least one processor, cause the communication apparatus to perform operations comprising:

obtaining policy related information based on a first neural network;

sending the policy related information to a second device, wherein the policy related information is for inputting a second neural network of the second device;

receiving information for updating the first neural network from the second device, wherein the information for updating the first neural network is related to the second neural network and the policy related information, wherein the information for updating the first neural network comprises a hidden layer error corresponding to the policy related information sent by the communication apparatus, and wherein the hidden layer error is an error of a first layer parameter of the second neural network that is obtained based on the second neural network of the second device and the policy related information sent by the communication apparatus;

updating the first neural network based on the information for updating the first neural network, and sending first update parameter information of the first neural network to a third device, wherein the third device and the second device are a same device or different devices;

receiving second update parameter information of the first neural network from the third device, wherein the second update parameter information of the first neural network is related to the first update parameter information of the first neural network sent by the communication apparatus and first update parameter information of at least one first neural network of another communication apparatus; and updating the first neural network based on the second update parameter information of the first neural network.

15. The communication apparatus according to claim 14, wherein the policy related information is related to a decision type of the second device, and different decision types comprise different types of transmission parameters for transmission between the second device and different communication apparatuses.

16. The communication apparatus according to claim 15, wherein the decision type comprises modulation and coding scheme (MCS) selection or multiple-input multiple-output (MIMO) mode selection.

17. The communication apparatus according to claim 14, wherein the second update parameter information of the first neural network is a function of the first update parameter information of the first neural network sent by the communication apparatus and the first update parameter information of the at least one first neural network of the another communication apparatus.

18. The communication apparatus according to claim 14, wherein the first update parameter information of the first neural network comprises the first gradient information of the first neural network, and the second update parameter information of the first neural network comprises target gradient information;

the updating the first neural network based on the information for updating the first neural network, and sending first update parameter information of the first neural network to a third device comprises:

calculating the first gradient information of the first neural network based on the hidden layer error; and sending the first gradient information to the third device; and the receiving second update parameter information of the first neural network from the third device comprises:

receiving target gradient information from the third device, wherein the target gradient information is related to the first gradient information of the first neural network sent by the communication apparatus and first gradient information of at least one first neural network of another communication apparatus.

19. The communication apparatus according to claim 18, wherein the information for updating the first neural network comprises the reward information corresponding to the communication apparatus, the first update parameter information of the first neural network comprises a parameter of an updated first neural network, and the second update parameter information of the first neural network comprises a target parameter of the first neural network;

the receiving information for updating the first neural network from the second device comprises:

receiving the reward information corresponding to the communication apparatus from the second device, wherein the reward information is related to the second neural network of the second device and the policy related information sent by the communication apparatus;

the updating the first neural network based on the information for updating the first neural network, and sending first update parameter information of the first neural network to a third device comprises:

updating the first neural network based on the reward information, to obtain a parameter of an updated first neural network; and sending the parameter of the updated first neural network to the third device; and the receiving second update parameter information of the first neural network from the third device comprises:

receiving the target parameter of the first neural network from the third device, wherein the target parameter of the first neural network is related to the parameter of the update first neural network sent by the communication apparatus and a parameter of at least one updated first neural network of another communication apparatus.

20. The communication apparatus according to claim 14, wherein the obtaining policy related information based on a first neural network comprises:

receiving a reference signal for channel state estimation from the second device, wherein the reference signal is related to the policy related information;

obtaining a channel state based on the reference signal; and inputting the channel state into the first neural network to obtain the policy related information.

* * * * *